(12) United States Patent
Leary et al.

(10) Patent No.: US 12,738,891 B2
(45) **Date of Patent: *Sep. 15, 2026**

(54) SMART SENSOR DEVICES FOR MEASURING AND VERIFYING SOLAR ARRAY PERFORMANCE AND OPERATIONAL METHODS FOR USE THEREWITH

(71) Applicant: PowerOwners, LLC, North Andover, MA (US)

(72) Inventors: Daniel P. Leary, North Andover, MA (US); Roy S. Greenwood, Gardner, MA (US)

(73) Assignee: POWEROWNERS, LLC, North Andover, MA (US)

( * ) Notice: Subject to any disclaimer, the term of this patent is extended or adjusted under 35 U.S.C. 154(b) by 109 days.

This patent is subject to a terminal disclaimer.

(21) Appl. No.: 18/795,291

(22) Filed: Aug. 6, 2024

(65) Prior Publication Data

US 2025/0141403 A1 May 1, 2025

Related U.S. Application Data

(63) Continuation of application No. 18/231,876, filed on Aug. 9, 2023, now Pat. No. 12,101,059, which is a (Continued)

(51) Int. Cl.
*H02S 50/00* (2014.01)
*F24S 50/20* (2018.01)
(Continued)

(52) U.S. Cl.
CPC .............. *H02S 50/00* (2013.01); *F24S 50/20* (2018.05); *G01J 1/44* (2013.01); *G01K 13/00* (2013.01);
(Continued)

(58) Field of Classification Search
CPC ....... H02S 50/00; F24S 50/20; F24S 2201/00; G01J 1/44; G01J 2001/4276;
(Continued)

(56) References Cited

U.S. PATENT DOCUMENTS 5,949,212 A 9/1999 Cherry
6,297,740 B1 10/2001 Hill et al.
(Continued)

FOREIGN PATENT DOCUMENTS

WO 2009068710 6/2009
WO 2024148151 7/2024

OTHER PUBLICATIONS

"Smart Sensor Devices for Measuring and Verifying Solar Array Performance and Operational Methods for Use Therewith" Specification, Drawings and Prosecution History of U.S. Appl. No. 15/980,010, filed May 15, 2018, now issued U.S. Pat. No. 10,284,140, issued on May 7, 2019 by Daniel P. Leary, et al.
(Continued)

*Primary Examiner* — Seung C Sohn
(74) *Attorney, Agent, or Firm* — Onello & Mello P.C.

(57) ABSTRACT

A device comprises a platform constructed and arranged to be mounted to one or more solar array modules and one or more solar irradiance sensors on the platform configured to receive incident solar energy, the one or more solar irradiance sensors oriented on the platform so that the received incident solar energy is comparable to that received by the solar array modules, the one or more solar irradiance sensors providing solar irradiance signals in response to the incident solar energy. A processor is on the platform, the processor configured to receive the solar irradiance signals and, in response, generating a performance reference metric based on the solar irradiance signals, the performance reference metric related to the expected performance of the one or
(Continued)

more solar array modules to which the platform is mounted. A transmitter is on the platform, the transmitter configured to periodically transmit the performance reference metric to a receiver.

19 Claims, 26 Drawing Sheets

Related U.S. Application Data continuation of application No. 17/343,835, filed on Jun. 10, 2021, now Pat. No. 11,742,796, which is a continuation of application No. 16/782,760, filed on Feb. 5, 2020, now Pat. No. 11,050,384, which is a continuation of application No. 16/377,838, filed on Apr. 8, 2019, now Pat. No. 10,594,257, which is a continuation of application No. 15/980,010, filed on May 15, 2018, now Pat. No. 10,284,140, which is a continuation of application No. 15/030,964, filed as application No. PCT/US2014/065653 on Nov. 14, 2014, now Pat. No. 9,991,844.

(60) Provisional application No. 61/904,169, filed on Nov. 14, 2013.

(51) Int. Cl.
*G01J 1/42* (2006.01)
*G01J 1/44* (2006.01)
*G01K 13/00* (2021.01)

(52) U.S. Cl.
CPC ... *F24S 2201/00* (2018.05); *G01J 2001/4276* (2013.01); *G01J 2001/4285* (2013.01); *Y02E 10/47* (2013.01)

(58) Field of Classification Search
CPC . G01J 2001/4285; G01K 13/00; Y02E 10/47; Y02E 10/50
See application file for complete search history.

(56) References Cited

U.S. PATENT DOCUMENTS

| | | | | |
|---|---|---|---|---|
| 6,512,458 | B1 | 1/2003 | Kobayashi et al. | |
| 6,849,842 | B2 | 2/2005 | Little | |
| D519,860 | S | 5/2006 | Bugbee | |
| 7,333,916 | B2 | 2/2008 | Warfield et al. | |
| 7,888,584 | B2 | 2/2011 | Lyden | |
| 8,152,108 | B2 | 4/2012 | Becker-Irvin et al. | |
| 8,507,837 | B2 | 8/2013 | Sherman et al. | |
| 9,325,364 | B2 | 4/2016 | Teichmann et al. | |
| 9,813,022 | B2 | 11/2017 | Singer et al. | |
| 9,830,301 | B1 | 11/2017 | Batten et al. | |
| 9,887,627 | B2 | 2/2018 | Erickson, Jr. et al. | |
| 9,991,844 | B2 | 6/2018 | Leary et al. | |
| 10,284,140 | B2 | 5/2019 | Leary et al. | |
| 10,594,257 | B2 | 3/2020 | Leary et al. | |
| 11,050,384 | B2 * | 6/2021 | Leary | H02S 50/00 |
| 11,742,796 | B2 * | 8/2023 | Leary | F24S 50/20<br>250/208.2 |
| 12,101,059 | B2 * | 9/2024 | Leary | G01K 13/00 |
| 2004/0016865 | A1 | 1/2004 | Little | |
| 2006/0085167 | A1 | 4/2006 | Warfield et al. | |
| 2008/0147335 | A1 | 6/2008 | Adest et al. | |
| 2008/0272279 | A1 | 11/2008 | Thompson | |
| 2009/0310391 | A1 | 12/2009 | Becker-Irvin et al. | |
| 2010/0108860 | A1 | 5/2010 | Sherman et al. | |
| 2010/0241375 | A1 | 9/2010 | Kumar et al. | |
| 2012/0310427 | A1 | 12/2012 | Williams et al. | |
| 2013/0062958 | A1 | 3/2013 | Erickson, Jr. et al. | |
| 2015/0244316 | A1 | 8/2015 | Singer et al. | |
| 2016/0254782 | A1 | 9/2016 | Leary et al. | |
| 2018/0375468 | A1 | 12/2018 | Leary et al. | |

OTHER PUBLICATIONS

"Smart Sensor Devices for Measuring and Verifying Solar Array Performance and Operational Methods for Use Therewith" Specification, Drawings and Prosecution History of U.S. Appl. No. 16/377,838, filed Apr. 8, 2019, now issued U.S. Pat. No. 10,594,257, issued Mar. 17, 2020, by Daniel P. Leary, et al.

"Smart Sensor Devices for Measuring and Verifying Solar Array Performance and Operational Methods for Use Therewith" Specification, Drawings and Prosecution History of United States U.S. Appl. No. 16/782,760, filed Feb. 5, 2020, now issued U.S. Pat. No. 11,050,384, issued on Jun. 29, 2021 by Daniel P. Leary, et al.

"Smart Sensor Devices for Measuring and Verifying Solar Array Performance and Operational Methods for Use Therewith" Specification, Drawings and Prosecution History of U.S. Appl. No. 17/343,835, filed Jun. 10, 2021, now issued U.S. Pat. No. 11,742,796, issued Aug. 29, 2023, by Daniel P. Leary, et al.

"Smart Sensor Devices for Measuring and Verifying Solar Array Performance" Specification, Drawings and Prosecution History of U.S. Appl. No. 15/030,964, filed Apr. 21, 2016, now issued U.S. Pat. No. 9,991,844, issued on Jun. 5, 2018 by Daniel P. Leary, et al.

Andrews, R. et al. "Effects of Snowfall on PV Systems", Presented at 2013 Sandia PV Performance Modeling Workshop, Santa Clara, CA., May 1-2, 2013. Published by Sandia National Laboratories.

Beran, M. "Can photovoltaic solar panels be calibrated to monitor solar radiation?" Weather, vol. 68, No. 6 (Jun. 2013), pp. 157-161.

Brench, B.L. "Snow-Covering Effects On the Power Output of Solar Photovoltaic Arrays", prepared for The U.S. Department of Energy Agreement No. DE-AC02-76ET20279 (Dec. 1979).

International Search Report and Written Opinion dated Jun. 27, 2024 issued in International Application No. PCT/US2024/010293 (Docket No. POW-003-PCT)..

International Search report and Written Opinion issued in corresponding PCT Application No. PCT/US14/65653 dated Feb. 24, 2015.

Deline, C. et al. "Photovoltaic Shading Testbed for Module-Level Power Electronics", National Renewable Energy Laboratory Technical Report NREL/TP-5200-54876 (May 2012) Contract No. DE-AC36-08GO28308.

Drews, A. et al. "Monitoring and remote failure detection of grid-connected PV systems based on satellite observations", Solar Energy, vol. 81, Issue 4 (Apr. 2007), pp. 548-564 (Abstract Only).

Ishaque, K. et al. "Modeling and simulation of photovoltaic (PV) system during partial shading based on a two-diode model", Simulation Modelling Practice and Theory, vol. 19, Issue 7 (Aug. 2011), pp. 1613-1626 (Abstract Only).

Pachpande, S.G. et al. "Studying the effect of shading on Solar Panel using MATLAB", International Journal of Science and Applied Information Technology, vol. 1, No. 2 (May-Jun. 2012), pp. 46-51.

Vergura, S. et al. "Descriptive and Inferential Statistics for Supervising and Monitoring the Operation of PV Plants", IEEE Transactions on Industrial Electronics, vol. 56 , Issue 11 (Nov. 2009), pp. 4456-4464 (Abstract Only).

Williams, N. "The Impact Snow Has on Solar Energy Production: A case study of the Morley photovoltaic array and the necessity for the removal or prevention of accumulated snow in the future", GEOS 206 Final Project Paper (May 19, 2009).

"Smart Sensor Devices for Measuring and Verifying Solar Array Performance and Operational Methods for Use Therewith" Specification, Drawings and Prosecution History of U.S. Appl. No. 18/231,876, filed Aug. 9, 2023, now issued U.S. Pat. No. 12,101,059, issued Sep. 24, 2024, by Daniel P. Leary, et al.

International Preliminary Report on Patentability dated Jul. 17, 2025 issued in International Application No. PCT/US2024/010293.

* cited by examiner

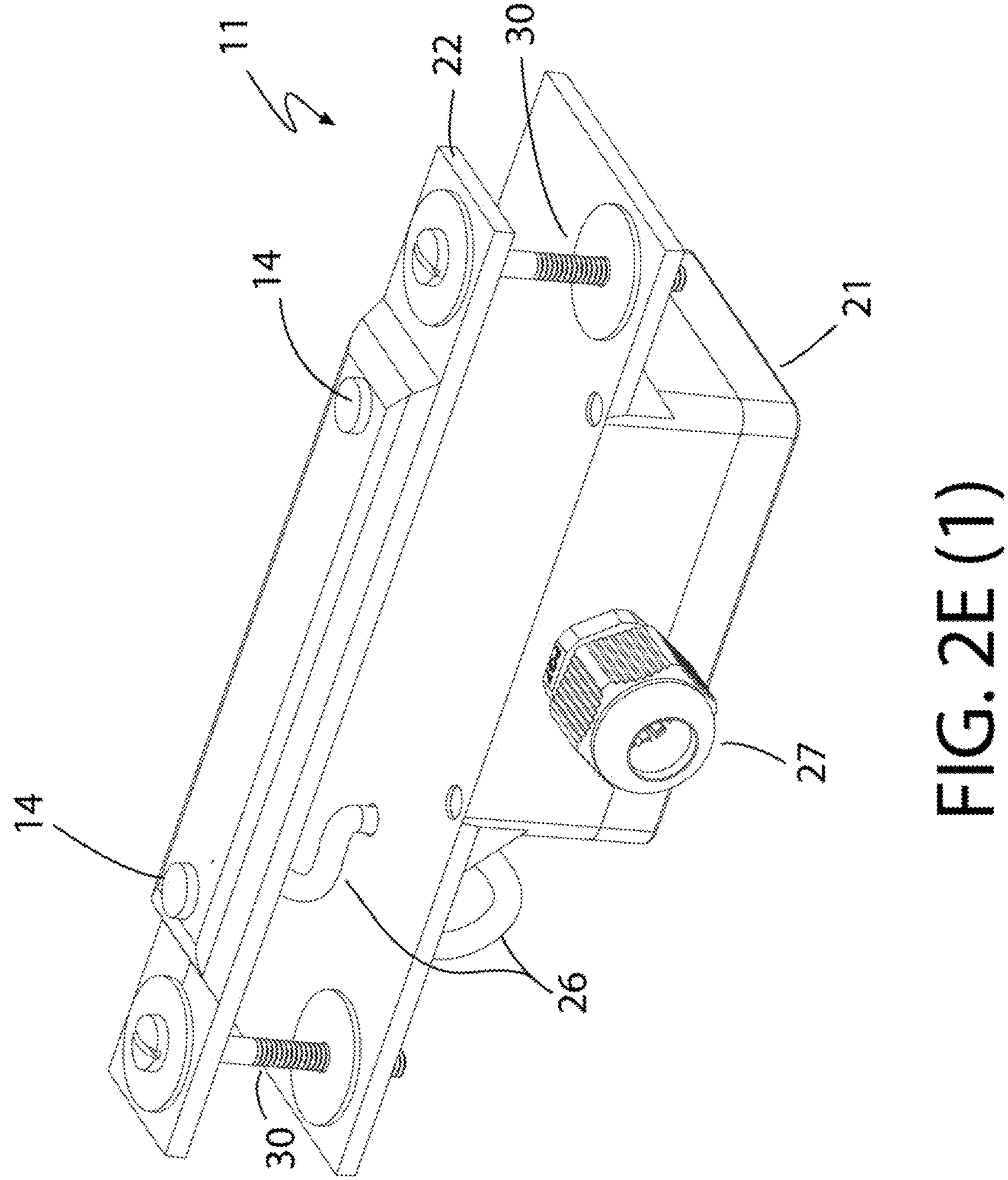
FIG. 2E (1)

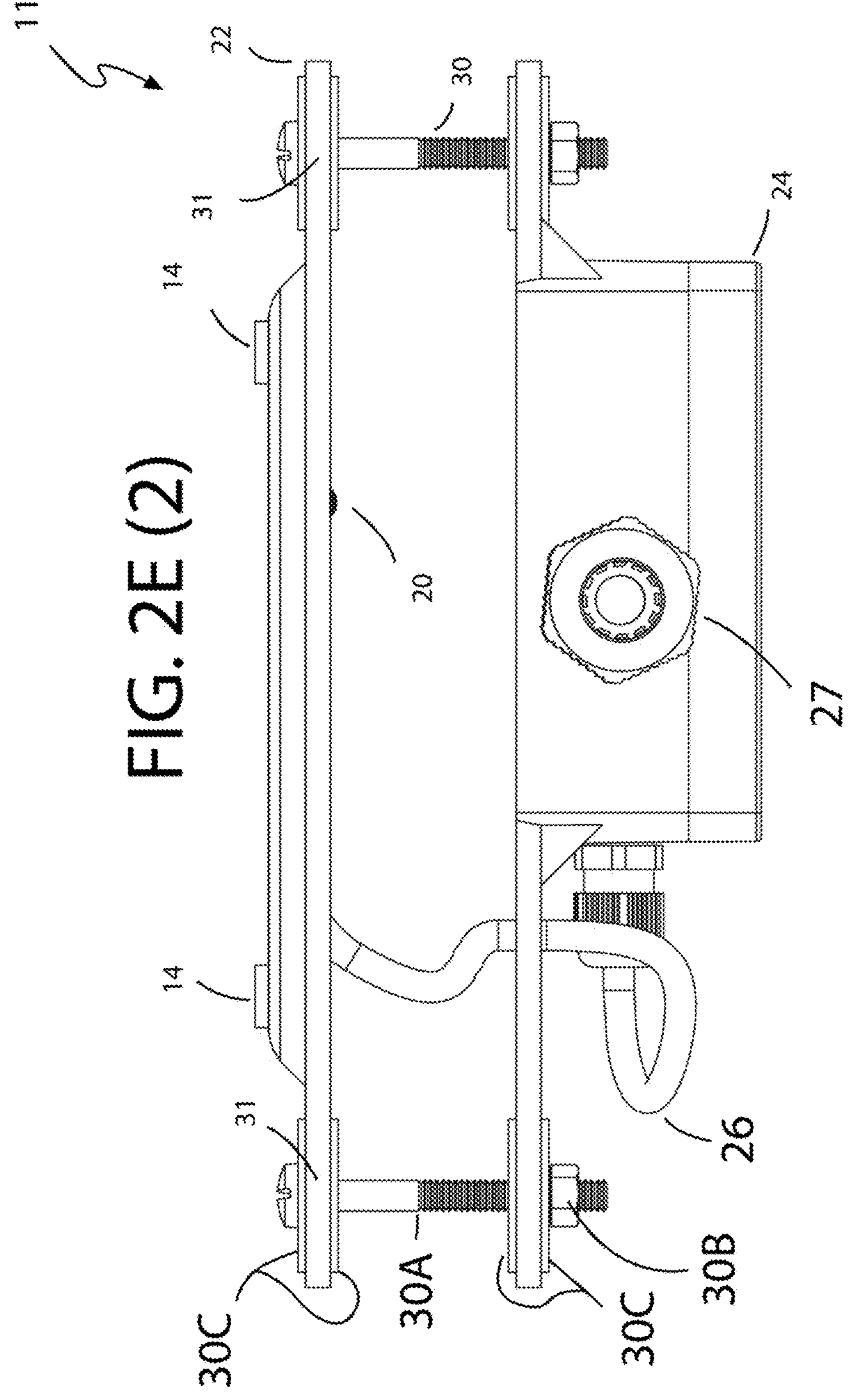
FIG. 2E (2)

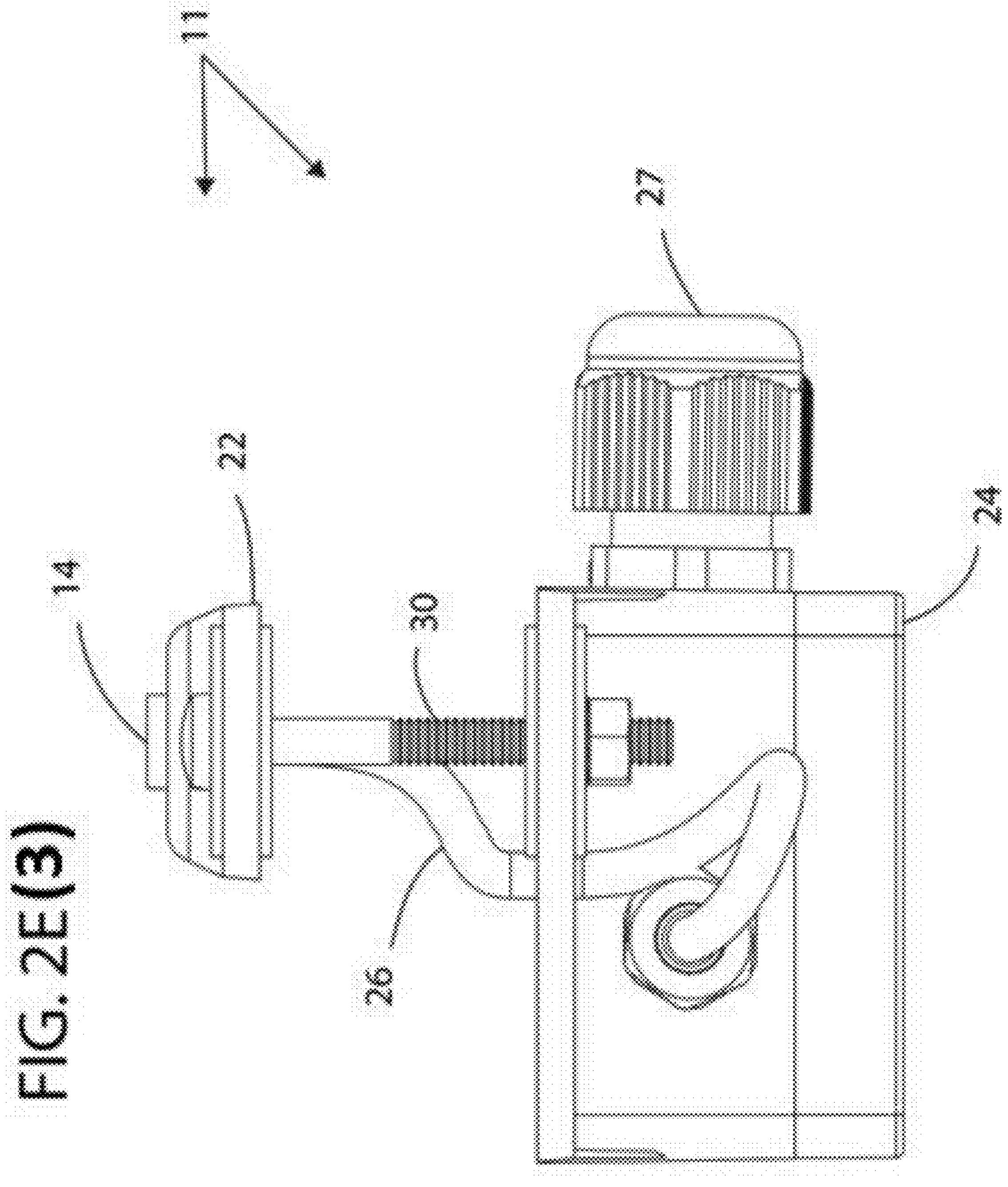
FIG. 2E(3)

| | Modes | | |
|---|---|---|---|
| | Daylight | Twilight | Dark |
| Wireless RF | | | |
| Samples | 5 sec | 30 sec | 30 min |
| Logs | 1 min | 6 min | 1 hour |
| Reports | 5 min | 30 min | 6 hours |
| Wired | | | |
| Samples | 5 sec | 30 sec | 30 min |
| Logs | 1 min | 6 min | 1 hour |
| Reports | 5 min | 6 min | 1 hour |
| Cellular/WIFI | | | |
| Samples | 5 sec | 30 sec | 30 min |
| Logs | 1 min | 6 min | 1 hour |
| Reports | As logs or down to 1x per day | | |

FIG 8

201
202
CPU
207
Memory
203
204
205
Display
206
Input devices
Signal Source

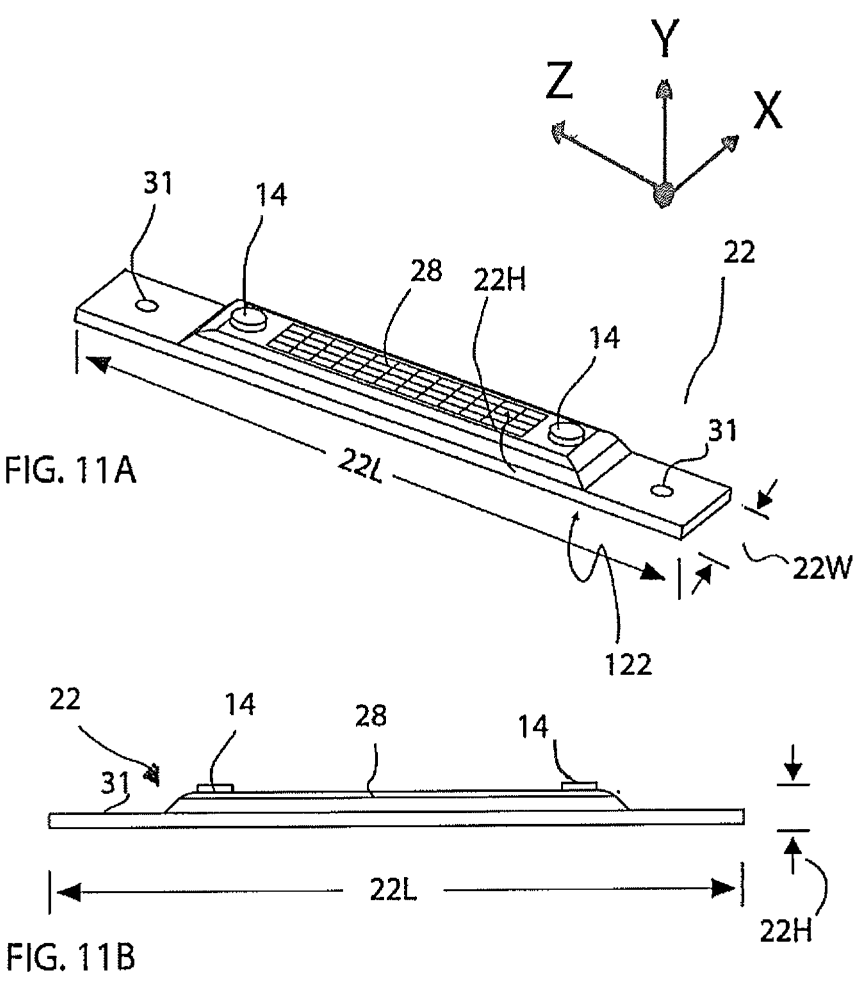
FIG. 11A
FIG. 11B
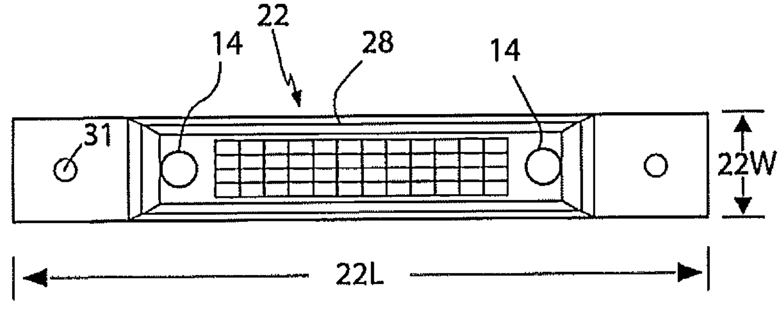
FIG. 11C

SMART SENSOR DEVICES FOR MEASURING AND VERIFYING SOLAR ARRAY PERFORMANCE AND OPERATIONAL METHODS FOR USE THEREWITH

CROSS-REFERENCE TO RELATED APPLICATION

This application is a continuation application of U.S. patent application Ser. No. 18/231,876, filed on Aug. 9, 2023, which issued on 09-24-2024 as U.S. Patent No. 12,101,059, which is a continuation of U.S. patent application Ser. No. 17/343,835, filed on Jun. 10, 2021, which issued on Aug. 29, 2023 as U.S. Pat. No. 11,742,796, which is a continuation application of U.S. patent application Ser. No. 16/782,760, filed on Feb. 5, 2020, which issued on Jun. 29, 2021 as U.S. Pat. No. 11,050,384, which is a continuation of U.S. patent application Ser. No. 16/377,838, filed on Apr. 8, 2019, which issued on Mar. 17, 2020 as U.S. Pat. No. 10,594,257, which is a continuation application of U.S. patent application Ser. No. 15/980,010, filed on May 15, 2018, which issued on May 7, 2019 as U.S. Pat. No. 10,284,140, which is a continuation application of U.S. patent application Ser. No. 15/030,964, filed on Apr. 21, 2016, which issued on Jun. 5, 2018 as U.S. Pat. No. 9,991,844, which is a 371 of International Application No.: PCT/US2014/0065653, filed Nov. 14, 2014, which claims the benefit of U.S. Provisional Patent Application No. 61/904,169, filed on Nov. 14, 2013, the entire content of which is incorporated by reference herein.

BACKGROUND

Technical Field

The present disclosure relates to monitoring systems for solar and energy systems, and, more particularly, to a smart sensor device for a solar system, a system that incorporates the smart sensor device, and operational methods for gauging performance of, or simulating the output of, solar energy systems.

Discussion of Related Art

Referring to FIG. 1, traditional weather monitoring hardware systems for monitoring efficiency of solar systems experience limitations due to high cost, non-standardized installation and operations, and inconsistent performance calculations and methods. Traditional weather stations typically are large standalone structures 10 located at positions away from the solar array modules 12 being monitored and require a source of power and/or communications lines. Limitations of such weather stations include high cost, making them almost non-existent in residential and small commercial applications due to price factors, non-standardization, meaning that vendors install and configure these units in non-standardized ways, and lack of packaging that accounts for real-world conditions such as snow and dirt.

SUMMARY

Embodiments of the present inventive concepts provide smart sensor devices that can provide an improved platform for gauging performance of solar energy systems. Embodiments of the present inventive concepts further provide methods for using and controlling smart sensor devices that can provide an improved platform for gauging performance of, or simulating the output of, solar energy systems. Other applications of the present inventive concepts can include providing a service to utilities for managing power distribution.

In accordance with exemplary embodiments of the present inventive concepts, environmental sensing, processing and transmitting based smart sensor devices, and operational methods therewith, provide such needed improved platform for gauging performance of solar energy systems.

In exemplary embodiments, smart sensor devices configured in accordance with the present inventive concepts mimic the physiology of a working solar energy system for the purpose of providing a reference point for gauging performance.

In exemplary embodiments, smart sensor devices can optionally include their own power supply and wireless communications systems.

In one aspect, a device comprises: a platform constructed and arranged to be mounted to one or more solar array modules: one or more solar irradiance sensors on the platform configured to receive incident solar energy, the one or more solar irradiance sensors oriented on the platform so that the received incident solar energy is comparable to that received by the solar array modules, the one or more solar irradiance sensors providing solar irradiance signals in response to the incident solar energy; a processor on the platform, the processor configured to receive the solar irradiance signals and, in response, generating a performance reference metric based on the solar irradiance signals, the performance reference metric related to the expected performance of the one or more solar array modules to which the platform is mounted; and a transmitter on the platform, the transmitter configured to periodically transmit the performance reference metric to a receiver.

In some embodiments, the device further comprises a temperature sensor that provides a device temperature signal and wherein the processor further generates the performance reference metric based on the device temperature signal.

In some embodiments, the processor further generates the performance reference signal based on a cell temperature signal that is calculated in response to the device temperature signal and the solar irradiance signals.

In some embodiments, the temperature sensor generates the device temperature signal periodically.

In some embodiments, the processor further generates the performance reference metric based on a dynamic derate value that is calculated based on an efficiency function of an inverter of the solar array modules in response to the solar irradiance signals.

In some embodiments, the efficiency function is non-linear.

In some embodiments, the processor further generates the performance reference metric based on a static value that is calculated based on an estimate of expected power loss in the solar array.

In some embodiments, the processor further compares the generated performance reference metric to a maximum value, and if the generated performance reference metric exceeds the maximum value, the generated performance related metric is set to the maximum value, the maximum value being determined in response to a known maximum AC power rating of the solar array modules.

In some embodiments, the processor further generates the performance reference metric based on a cumulative irradiance value, the cumulative irradiance value being based on multiple ones of the solar irradiance signals accumulated over a time period.

In some embodiments, the processor further generates the performance reference metric as a cumulative performance related matric based on multiple ones of the generated the performance reference metric accumulated over a time period.

In some embodiments, the time period over which the performance reference metrics are accumulated is one hour.

In some embodiments, the transmitter is further configured to transmit the performance reference metric periodically in response to a mode of operation, the mode of operation being determined in response to the time of day.

In some embodiments, the mode of operation results in more frequent transmission during a time of day where more intense sun exposure is expected and results in less frequent transmission during a time of day when less intense or no sun exposure is expected.

In some embodiments, the processor is further configured to generate the performance reference metric periodically in response to a mode of operation, the mode of operation being determined in response to the time of day.

In some embodiments, the mode of operation results in more frequent generation of the performance reference metric during a time of day where more intense sun exposure is expected and results in less frequent generation of the performance reference metric during a time of day when less intense or no sun exposure is expected.

In some embodiments, a portion of the platform is constructed and arranged to be positioned on a top surface of the one or more solar panels, the portion having a maximum width in a first horizontal direction and having a maximum height above the top surface in a vertical direction, wherein the maximum width is greater than or equal to two times the maximum height.

In some embodiments, a portion of the platform is constructed and arranged to be positioned on a top surface of the one or more solar panels, the portion having a maximum width in a first horizontal direction and having a maximum height above the top surface in a vertical direction, wherein the maximum width is greater than or equal to three times the maximum height.

In some embodiments, the platform comprises a circuit board and wherein solar irradiance sensor comprises a pyranometer, the pyranometer comprising: a diffuser for receiving incident solar energy, the diffuser having an inner chamber; and a photodiode positioned in the inner chamber for converting the solar energy received by the diffuser into a current signal; wherein the inner chamber is of a sufficient height to accommodate a maximum height of a photodiode selected among a plurality of photodiode types; and wherein the inner chamber is of a sufficient width to accommodate a maximum width of a photodiode selected among a plurality of photodiode types.

In some embodiments, the circuit board includes a photodiode pad including a plurality of conductive pads for mounting any among the plurality of photodiode types.

In some embodiments, the platform further comprises a power source for powering the processor and the transmitter.

In some embodiments, the power source comprises a solar collector on the platform and a power storage element for storing energy collected by the solar collector.

In some embodiments, the power storage element comprises a super capacitor.

In some embodiments, the solar collector and storage element comprises the exclusive power source for the device.

In some embodiments, the device further comprises a supplemental battery.

In some embodiments, the processor is configured to further receive signals from a third-party sensor for calibration of the one or more solar irradiance sensors.

In another aspect, a smart sensor device for performance measurement and verification of a solar array having one or more solar panels, the smart sensor device comprises: a device platform configured to be mounted on one or more solar array modules; one or more irradiance sensor devices configured to be mounted on the device platform such that the one or more irradiance sensor devices receive solar irradiance comparable to that received by a solar panel of the solar array; a temperature sensor configured to be mounted on the device platform such that the temperature sensor is used to calculate a solar module temperature at the solar array; and a processor, within the smart sensor device, configured to process data corresponding to the solar irradiance and an ambient temperature received by the smart sensor device and to transmit performance monitoring data to a data monitoring user.

In some embodiments, the irradiance sensor device is mounted between a pair of solar panels.

In some embodiments, the irradiance sensor device comprises a pyranometer.

In some embodiments, the one or more irradiance sensor devices are mounted on one side of the device platform such that primary solar irradiance receiving surfaces of the irradiance sensor devices are substantially parallel to the solar panels, and the temperature sensor is mounted on an opposing side of the device platform.

In some embodiments, the smart sensor device further comprises a device solar panel mounted on the device platform configured to provide power to operate the smart sensor device.

In some embodiments, the smart sensor device further comprises a battery pack to provide supplemental power to operate the smart sensor device.

In some embodiments, the performance monitoring data is transmitted to a data monitoring user using standardized transmission protocols.

In some embodiments, the performance monitoring data is transmitted by a transceiver located within the smart sensor device.

In some embodiments, the performance monitoring data is transmitted using Zigbee protocol wireless radio transceivers.

In some embodiments, the processor is mounted in a secondary device platform coupled to the device platform.

In some embodiments, the smart sensor device operates in two or more modes of operation in view of time of operation.

In some embodiments, the modes of operation comprise a daylight mode, a twilight mode and a night mode.

In some embodiments, data is processed and resulting performance monitoring data is transmitted to a data monitoring user according to the following equation:

$$Denowatts^{TM}\ metric = \sum_{1}^{n}\left(\frac{Irr(Pdc)(1+\alpha((Tcell-25)))}{\left(\frac{1}{n}\right)(3600)(1000)}\right)(\text{Derate Factor})$$

wherein:

-continued $$Denowatts^{TM}\ metric \leq Pac/\left(\frac{1}{n}*3600\right)$$

ELSE $$Denowatts^{TM}\ metric = Pac/\left(\frac{1}{n}*3600\right)$$

and wherein:

n: Time sample interval (seconds)

Irr: Computed Irradiance Measurement

Pdc: DC Power Rating of the solar array

Pac: Maximum Output AC Power Rating of the solar array

α: Reference Module Temperature Coefficient (Power)

Tcell: Calculated Solar Cell Temperature may be calculated as $$Tcell = (Tdevice)(\delta(Irr) + \varepsilon)$$

wherein:

Tdevice: Device temperature recorded on the device platform

δ and ε: calculated constants related to a reference cell

Static and Dynamic Derate Factors $$\text{Derate Factor} = \beta(\gamma)$$

wherein:

β: Static Derate Factor

γ: Dynamic Derate Factor described by one or more polynomial equation(s) derived from the operating efficiency of a reference inverter and other system characteristics relative to irradiance conditions.

In another aspect, a method for performance monitoring of a solar array comprises: mounting a smart sensor device on one or more solar array modules, the smart sensor device being configured to receive solar irradiance and ambient temperature; processing, within the smart sensor device, data corresponding to the solar irradiance and ambient temperature received by the smart sensor device to provide performance monitoring data; and transmitting the performance monitoring data to a remote data monitoring user or a remote data services supplier.

In some embodiments, the method further comprises mounting the smart sensor device between a pair of solar panels.

In some embodiments, smart sensor device comprises a pyranometer.

In some embodiments, the method further comprises mounting a one or more irradiance sensor devices on one side of a device platform such that primary solar irradiance receiving surfaces of the irradiance sensor devices are substantially parallel to the solar panels, and mounting a temperature sensor on an opposing side of the device platform.

In some embodiments, the method further comprises mounting a device solar panel on the device platform to provide power to operate the smart sensor device.

In some embodiments, the method further comprises providing a battery pack to provide supplemental power to operate the smart sensor device.

In some embodiments, the method further comprises transmitting the performance monitoring data to the data monitoring user using standardized transmission protocols.

In some embodiments, the method further comprises transmitting the performance monitoring data by a transceiver located within the smart sensor device.

In some embodiments, the method further comprises transmitting the performance monitoring data using Zigbee protocol wireless radio transceivers.

In some embodiments, the method further comprises mounting the processor in a secondary device platform coupled to the device platform.

In some embodiments, the method further comprises operating the smart sensor device in two or more modes of operation in view of time of operation In some embodiments, the modes of operation comprise a daylight mode, a twilight mode and a night mode.

In some embodiments, processing data and transmitting resulting performance monitoring data to a data monitoring user is according to the following equation:

$$Denowatts^{TM} metric = \sum_{1}^{n}\left(\frac{Irr(Pdc)(1+\alpha((Tcell-25)))}{\left(\frac{1}{n}\right)(3600)(1000)}\right)(\text{Derate Factor})$$

wherein:

$$Denowatts^{TM} metric \leq Pac/\left(\frac{1}{n}*3600\right)$$

ELSE $$Denowatts^{TM} metric = Pac/\left(\frac{1}{n}*3600\right)$$

and wherein:

n: Time sample interval (seconds)

Irr: Computed Irradiance Measurement (computed above)

Pdc: DC Power Rating of the solar array

Pac: Maximum Output AC Power Rating of the solar array

α: Reference Module Temperature Coefficient (Power)

Tcell: Calculated Solar Cell Temperature may be calculated as $$Tcell = (Tdevice)(\delta(Irr) + \varepsilon)$$

wherein:

Tdevice: Device temperature recorded on the device platform

δ and ε: calculated constants related to a reference cell

Static and Dynamic Derate Factors $$\text{Derate Factor} = \beta(\gamma)$$

wherein:

β: Static Derate Factor

γ: Dynamic Derate Factor described by one or more polynomial equation(s) derived from the operating efficiency of a reference inverter and other system characteristics relative to irradiance conditions.

In some embodiments, the processing of data further comprises: calculating and accumulating a total amount of Sun-Hours collected from an integral of irradiance data; and storing and transmitting the total amount of Sun-Hours to the remote data monitoring user.

In some embodiments the method further comprises: receiving by the smart sensor device from a remote data monitoring user or from a remote data services provider configuration adjustment data such that one or more of the following can be adjusted at the smart sensor device: component calibration, simulation parameters, instruction code, and sensor drift of an irradiance sensor of the smart sensor device, and processing by the smart sensor device the configuration adjustment data to update the smart sensor device.

In some embodiments, an adjustment of sensor drift of the irradiance sensor comprises updating irradiance sensor voltage gain and offset.

In another aspect, a non-transitory computer program storage device embodying instructions executable by a processor to perform performance monitoring of a solar array comprises: instruction code for processing data corresponding to solar irradiance and ambient temperature received by a smart sensor device mounted on a solar array module to provide solar array performance monitoring data; and instruction code for transmitting the solar array performance monitoring data to a remote data monitoring user or remote date services supplier.

In another aspect, a solar simulator for generating reference data of a solar array, comprises: a processor configured to process data received by a solar irradiance sensor and a temperature sensor, the processor being mounted on the solar array proximal to solar panels of the solar array, wherein the data processed is configured to provide reference data characteristics for measuring the performance of the solar array.

In some embodiments, the reference data characteristics are configured to compare the performance of a second solar array with the performance of the solar array.

In another aspect, a solar irradiance sensor device comprises: a diffuser configured to receive and condition light; at least one photodiode configured to convert light into voltage; and a circuit board configured to mount one or more photodiodes having different frequency response characteristics, wherein the diffuser is mountable over the one or more photodiodes such that a height of the solar irradiance sensor device is less than a width of the solar irradiance sensor device.

In some embodiments, the frequency response characteristics of multiple photodiodes are calculated to provide broadband spectral response data.

In some embodiments, a height of the solar irradiance sensor device is less than three times the width of a platform upon which the solar irradiance sensor device is mounted.

In another aspect, a self-powered solar sensor device, comprises: a device platform configured to be mounted on one or more solar array modules; one or more irradiance sensor devices configured to be mounted on the device platform such that the one or more irradiance sensor devices receive solar irradiance comparable to that received by a solar panel of the solar array; a temperature sensor configured to be mounted on the device platform such that the temperature sensor determines the ambient temperature at the solar array; a processor, within the smart sensor device, configured to process data corresponding to the solar irradiance and the ambient temperature received by the smart sensor device and to transmit performance monitoring data to a remote data monitoring user or a remote data services supplier; and an internal power source configured to power the self-powered solar sensor device without a need for an external power source.

In some embodiments, the irradiance sensor device is mounted between a pair of solar panels.

In some embodiments, the irradiance sensor device comprises a pyranometer.

In some embodiments, the one or more irradiance sensor devices are mounted on one side of the device platform such that primary solar irradiance receiving surfaces of the irradiance sensor devices are substantially parallel to the solar panels, and the temperature sensor is mounted on an opposing side of the device platform.

In some embodiments, the self-powered sensor device further comprises a device solar panel mounted on the device platform configured to provide power to operate the smart sensor device.

In some embodiments, the self-powered sensor device further comprises a battery pack to provide supplemental power to operate the smart sensor device.

In some embodiments, the performance monitoring data is transmitted to the remote data monitoring user or to the remote data services supplier using standardized transmission protocols.

In some embodiments, the performance monitoring data is transmitted by a transceiver located within the smart sensor device.

In some embodiments, the performance monitoring data is transmitted using Zigbee protocol wireless radio transceivers.

In some embodiments, the processor is mounted in a secondary device platform coupled to the device platform.

In some embodiments, the smart sensor device operates in two or more modes of operation in view of time of operation.

In some embodiments, the modes of operation comprise a daylight mode, a twilight mode and a night mode.

In some embodiments, data is processed and resulting performance monitoring data is transmitted to the data monitoring user or to the data services supplier according to the following equation:

$$Denowatts^{TM} metric = \sum_{1}^{n}\left(\frac{Irr(Pdc)(1+\alpha((Tcell-25)))}{\left(\frac{1}{n}\right)(3600)(1000)}\right)\text{(Derate Factor)}$$

wherein:

$$Denowatts^{TM}\ metric \leq Pac/\left(\frac{1}{n}*3600\right)$$

ELSE $$Denowatts^{TM}\ metric = Pac/\left(\frac{1}{n}*3600\right)$$

and wherein:

n: Time sample interval (seconds)

Irr: Computed Irradiance Measurement (computed above)

Pdc: DC Power Rating of the solar array

Pac: Maximum Output AC Power Rating of the solar array α: Reference Module Temperature Coefficient (Power)

Tcell: Calculated Solar Cell Temperature may be calculated as $$Tcell = (Tdevice)(\delta(Irr)+\varepsilon)$$

wherein:

Tdevice: Device temperature recorded on the device platform

δ and ε: calculated constants related to a reference cell

Static and Dynamic Derate Factors $$\text{Derate Factor} = \beta(\gamma)$$

wherein:

β: Static Derate Factor

γ: Dynamic Derate Factor described by one or more polynomial equation(s) derived from the operating efficiency of a reference inverter and other system characteristics relative to irradiance conditions.

In some embodiments, the processor is further configured to receive from the remote data monitoring user or from the remote data services provider configuration adjustment data such that one or more of the following can be adjusted at the smart sensor device: component calibration, simulation parameters, instruction code, and sensor drift of an irradiance sensor of the smart sensor device, and to process the configuration adjustment data to update the smart sensor device.

In some embodiments, an adjustment of sensor drift of the irradiance sensor comprises updating irradiance sensor voltage gain and offset.

BRIEF DESCRIPTION OF THE DRAWINGS

The foregoing and other objects, features and advantages of embodiments of the present inventive concepts will be apparent from the more particular description of exemplary embodiments, as illustrated in the accompanying drawings in which like reference characters refer to the same elements throughout the different views. The drawings are not necessarily to scale, emphasis instead being placed upon illustrating the principles of the exemplary embodiments.

FIG. 8 is a table of sampling, logging and reporting times for various communication modes for daylight, twilight and dark modes in accordance with exemplary embodiments of the present inventive concepts.

FIGS. 11A, 11B and 11C are top-perspective, side and top views respectively of an embodiment of the device platform, in accordance with the present inventive concepts.

DETAILED DESCRIPTION OF EXEMPLARY EMBODIMENTS

Figure 1:
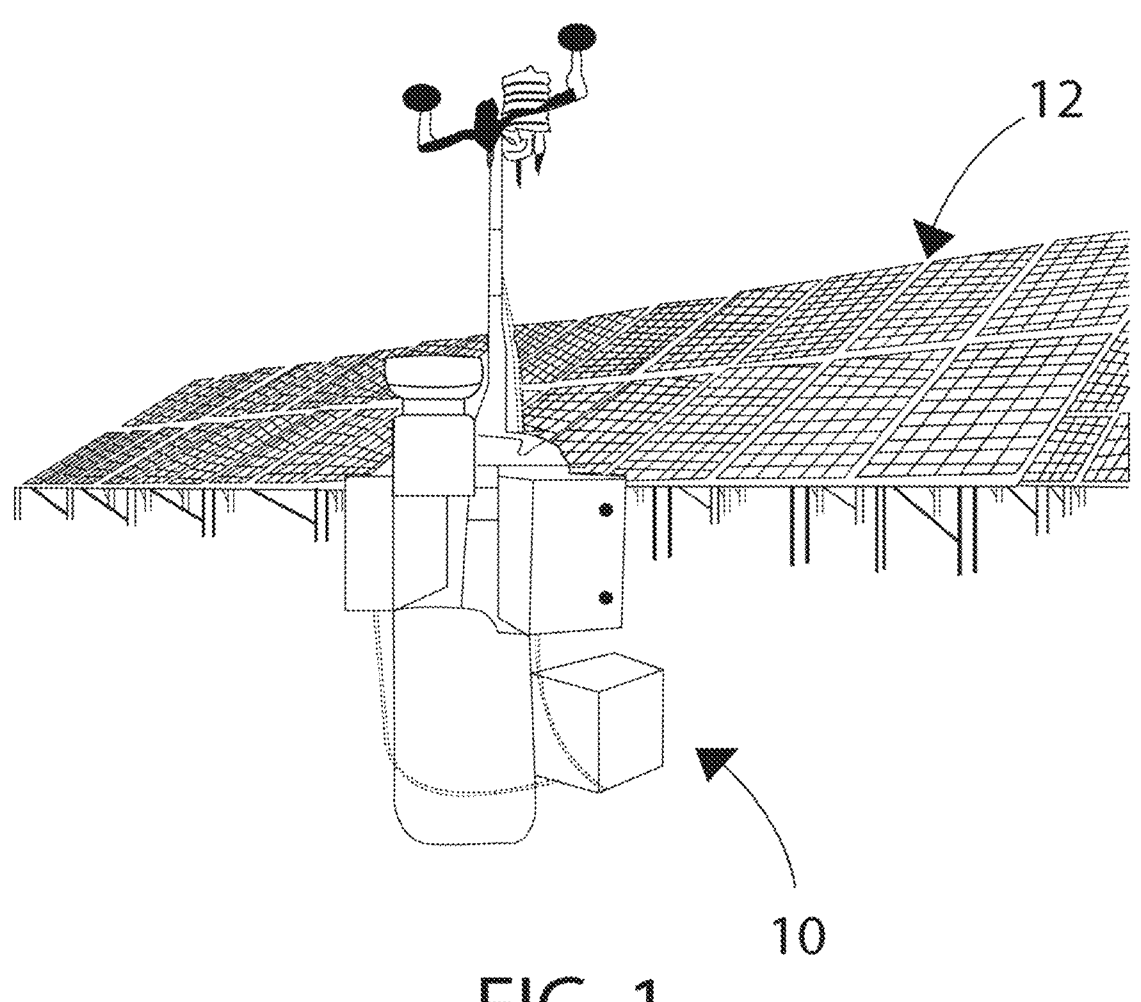
FIG. 1 depicts a typical weather station for monitoring a solar array.

Various exemplary embodiments will be described more fully hereinafter with reference to the accompanying drawings, in which some exemplary embodiments are shown. The present inventive concepts may, however, be embodied in many different forms and should not be construed as limited to the exemplary embodiments set forth herein.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As may be used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present inventive concepts.

Spatially relative terms, such as "beneath," "below," "lower," "above," "upper" and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terminology used herein is for the purpose of describing particular exemplary embodiments only and is not intended to be limiting of the present inventive concepts. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments may be described herein with reference to cross-sectional illustrations that are schematic illustrations of idealized exemplary embodiments (and intermediate structures). As such, variations from the shapes of the illustrations as a result, for example, of manufacturing techniques and/or tolerances, are to be expected. Thus, exemplary embodiments should not be construed as limited to the particular shapes of regions illustrated herein but are to include deviations in shapes that result, for example, from manufacturing. Thus, the regions illustrated in the figures are schematic in nature and their shapes are not intended to illustrate the actual shape of a region of a device and are not intended to limit the scope of the present inventive concepts.

The smart sensor devices and methods in accordance with exemplary embodiments of the present inventive concepts provide a streamlined solution for solar performance benchmarking. In some embodiments, such devices and methods are constructed and arranged to communicate with monitoring platforms via communication protocols, for example standardized transmission protocols and provide information to a monitoring user comparing desired solar performance versus actual solar performance.

In some embodiments, smart sensor devices in accordance with the present inventive concepts can include one or more of plane of array (POA) irradiance sensors and module cell temperature sensors. Solar array energy production can be simulated. Wireless communication (including greater than 800 feet in urban conditions) can be provided. Energy harvesting technology allows the smart sensor devices to be self-powered. The smart sensor devices may be configured such that "drop in" installations (fitting in the gap between two solar array modules) can be provided. A receiver/gateway can be readily installed in the vicinity of the 800 foot range smart sensor devices for communication with third-party monitoring. The smart sensor devices can be remotely managed to ensure optimum reliability and accuracy. The smart sensor devices can be licensed as a service to deliver needed monitoring information without the hassle of hardware management.

In exemplary embodiments the smart sensor devices can capture environmental conditions such that it simulates a reference solar array. In some embodiments, the smart sensor devices can operate in a daylight mode, a twilight mode and a night mode to avoid a necessity of processing excess data. During daylight conditions the smart sensor device logs POA irradiance data via one or more pyranometer type units, as well as a calculated module cell temperature. Measurement samples can be taken periodically, for example every 5 seconds, and logged as average POA irradiance, cell temperature and KWh equivalent (a Denowatts™ calculation) calculated periodically, for example each minute, made into a record with irradiance and temperature periodically, for example each minute, simulating the physiology of a reference solar array (Denowatts™ is a trademark of PowerOwners). In some embodiments data can be transmitted periodically, for example every 5 minutes to a receiver/gateway.

In exemplary embodiments, the Denowatts™ metric calculation can include a simulated energy generation value which is analogous to Kilowatt-Hours, representing a reference solar array. Calculations are performed in the smart sensor devices using an embedded processor. Fog Computing (a paradigm that extends Cloud computing and services to the edge of the network and provides data, compute, storage, and application services to end-users) can be performed at the smart sensor device, which in turn can significantly reduce the amount of data that needs to be sent and the power required. Embedded microprocessors in the smart sensor devices execute processes, for example, processes implemented in software code that implement the fog computing at a location proximal the sensors, rather than through cloud computing by remote servers. In this manner, an improved, less-expensive more-expeditious approach to data processing and performance monitoring is provided. Equations used to perform the metric calculations can be derived from years of measuring and verifying solar asset performance.

The Denowatts™ calculation metric accounts for a number of performance-related parameters. In some embodiments, such parameters can include on or more of irradiance, temperature, static and dynamic system derating, or other parameters indicative of system performance. The Denowatts™ calculation metric incorporates various on-site variables, system specifications and derived data for typical operating conditions. In some embodiments the on-site variables can include POA irradiance. In some embodiments the on-site variables can include sensor temperature. In some embodiments, the system specifications can include DC standard test condition (STC) rating of a DC to AC inverter maximum AC output. In some embodiments, the derived data can include static derate, which in turn can comprise observed DC to AC derating. In some embodiments, the derived data can include dynamic derate as observed inverter efficiency curve data. As described herein, various modes of operation can be employed, depending on, among other things, the time of day. For example, while operating in a "day" mode, the smart sensor devices can perform the Denowatts™ calculation every minute using 5 second interval sample data to deliver exceptional granularity and accuracy across a broad range of environmental conditions. At other times of the day, the sample data interval, the Denowatts™ calculation interval, and the transmission interval can be lengthened so that they are performed less frequently, and therefore consume less system power.

In some embodiments the smart sensor devices can be powered according to a number of different approaches. For example, they can be self-powered by integrated energy harvesting circuits, such as one or more solar cells and one or more super capacitors, for a power source. In another example, a battery source, for example a lithium battery pack, can optionally be included to provide years of auxiliary power during extended dark conditions when the solar based source may be unavailable. In other example embodiments, the power source can comprise a wired power source.

In exemplary embodiments communications between the smart sensor devices and the receiver/gateway can utilize powerful 900 MHz Zigbee protocol wireless radio transceivers. Reliable transmission over 1500 feet can be observed in urban environments when exemplary embodiments of the smart sensor devices employ integrated antennas. Further optional antennas can be included to extend transmission over 2500 feet.

In exemplary embodiments the smart sensor devices can employ a receiver/gateway that can interface with a remote monitoring service using standardized transmission protocols. In some embodiments, the MODBUS TCP protocol can be employed. In some embodiments, receiver/gateway can utilize 24V dc power and have Ethernet connectivity. For example, in some embodiments, the system can operate in an always "on", for example, via broadband, modem, cellular or wired communications In exemplary embodiments, one or more of the smart sensor devices can be mounted to an existing or potential solar array for the purpose of determining energy resources and to monitor their production of an expected power and energy output. In some embodiments, the smart sensor device can be packaged and programmed to behave like a miniature solar array; however, instead of producing energy, it produces information. In some embodiments, such information can be calculated according to the processes described herein, which, in turn, may then be used as a reference point for determining solar performance verification or potential solar performance of a solar array. In some embodiments, the smart sensor devices can be self-contained, for example, each can include its own power source, wireless communication system, processing system, and data storage system.

In some embodiments, the smart sensor devices can be packaged in a weather-resistant container. In some embodiments, the container can be mounted to one or more solar array panels in such a manner that irradiance sensors on the container are mounted or otherwise fixed to be oriented in a plane that is parallel to a plane on which the solar modules or panels are arranged, so that the orientation of the sensor is such that the sensors receive the same light, and at the same orientation, as the solar cells of the solar panels.

In operation, the smart sensor devices in accordance with embodiments of the present inventive concepts can be configured to fixed weather stations which are commonly used to collect and report weather data. Such conventional weather stations commonly produce only processed data related to sensors such as sun intensity and temperature. In contrast, systems and methods of the present inventive concepts can be configured to additionally produce calculated metrics that represent the production of an actual solar array, as described herein. In this manner, the smart sensor device can be considered to be a "smart and self-contained" unit.

According to the systems and methods of the present inventive concepts, the processing of data may further include calculating and accumulating a total amount of Sun-Hours collected from the integral of irradiance data, and storing and transmitting the total amount of Sun-Hours to the data monitoring user. The accumulation may be used to ensure that incident irradiance flux is recorded, even during power outages, such that the delivery of measurement and verification services is maintained. The accumulated irradiance data can be used in the process of compiling an adjusted performance baseline which can address the question: "Is my solar array actually doing what it is modeled to do?"

Various exemplary embodiments of the present inventive concepts can be generally characterized, according to the following: sensing, processing, transmitting, and form factor. Such categories are included here only for purposes of discussion, and embodiments are not thus limited.

Referring to FIGS. 2A, 2B, 2C, 2D, 2E(1), 2E(2), 2E(3), 2F, and 2G exemplary embodiments of a smart sensor device for performance monitoring of a solar array having one or more solar panels are depicted.

Figure 2A:
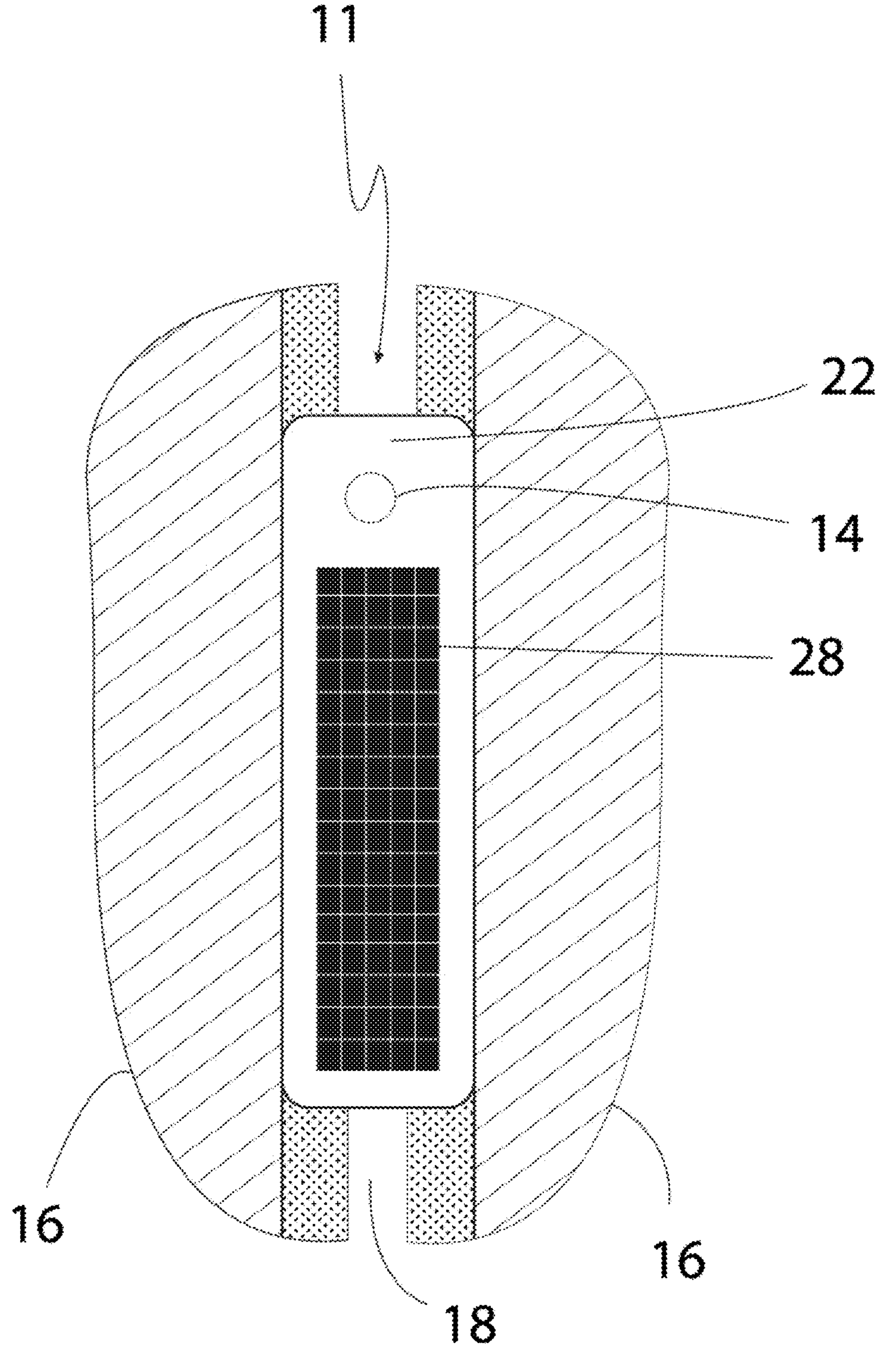
FIGS. 2A, 2B, 2C, 2D, 2E(1), 2E(2), 2E(3), 2F, 2G and 2H are various views of smart sensor devices in accordance with exemplary embodiments of the present inventive concepts.

In some embodiments, a smart sensor device 11 in accordance with the present inventive concepts comprises one or more solar irradiance sensors 14, and one or more optional temperature sensor 20, mounted to a device platform 22 or housing. In some embodiments, the device platform 22 can comprise a primary platform 22 that can be coupled to a secondary device platform 24. In some embodiments, together, the primary 22 and secondary 24 device platforms house the one or more solar irradiance sensors 14, the one or more optional temperature sensors 20, and additional componentry employed for carrying out the processes of the present inventive concepts. In some embodiments, the primary device platform 22 is constructed and arranged to be seated at a top of the neighboring solar array panels 16 to which the device is mounted, and the secondary device platform 24 is constructed and arranged to be seated at a bottom of the neighboring solar array panels 16 to which the device is mounted. In some embodiments, the primary device platform 22, and, if employed, the secondary device platform 24 are configured to be mounted between edges of two neighboring panels 16 having a gap 18 between them as seen in FIG. 2A In some embodiments, for example referring to FIG. 2B, the smart sensor device 11 may further include one or more of system processing electronics 75, a power source 73, a communication transceiver 77 a power storage element 79 and a secondary circuit panel 81 for supporting the devices and communications between them. In some embodiments, the system processing electronics 75 can include a processor, related input/output electronics, volatile system memory and non-volatile system memory utilized for carrying out system processes. In some embodiments the power source 73 can comprise a battery pack or other source of power. In some embodiments, the communication transceiver can comprise componentry used for implementing wireless or wired communication between the smart sensor device 11 and a remote receiver/gateway system.

In some embodiments, the system processing electronics 75 may be positioned at the primary platform 22, the secondary device platform, or both 22, 24. In some embodiments, a power source 75 may be positioned at the primary platform 22, the secondary device platform 24, or both 22, 24. In some embodiments, the communication transceiver 77 may be positioned at the primary platform 22, the secondary device platform, or both 22, 24. In some embodiments, electronic signals can be communicated between components of the primary 22 and secondary 24 platforms via a cable 26. In other embodiments, the electronic signals can be communicated between components of the primary 22 and secondary 24 platforms in a wireless arrangement.

In some embodiments, the smart sensor device 11 may further include a device solar array 28. In some embodiments, the device solar array 28 can be positioned at an upper surface of the primary platform 22, so as to be directly exposed in incident sunlight. In some embodiments, the device solar array 28 can be employed to provide a power source to the smart sensor device 11. Energy absorbed by and converted by the device solar array 28 can be stored in a harnessed power storage element 79, for example a capacitor or a super capacitor. The energy stored in the harnessed power storage element 79 can in turn be used to power the operations of the smart sensor device. In some embodiments the device solar array 28 and harnessed power storage element 79 can operate as the primary power source for the smart sensor device 11. In some embodiments, the device solar array 28 and power storage element 79 can operate as the sole power source for the smart sensor device 11. In some embodiments, the device solar array 28 can be used to re-charge the power source 73, for example, the battery pack, for the smart sensor device 11. In such an arrangement, the power storage element 79 may not be needed. In embodiments where the power storage element 79 is included, the power storage element 79 may be positioned at the primary platform 22, the secondary device platform, or both 22, 24.

Figure 2B:
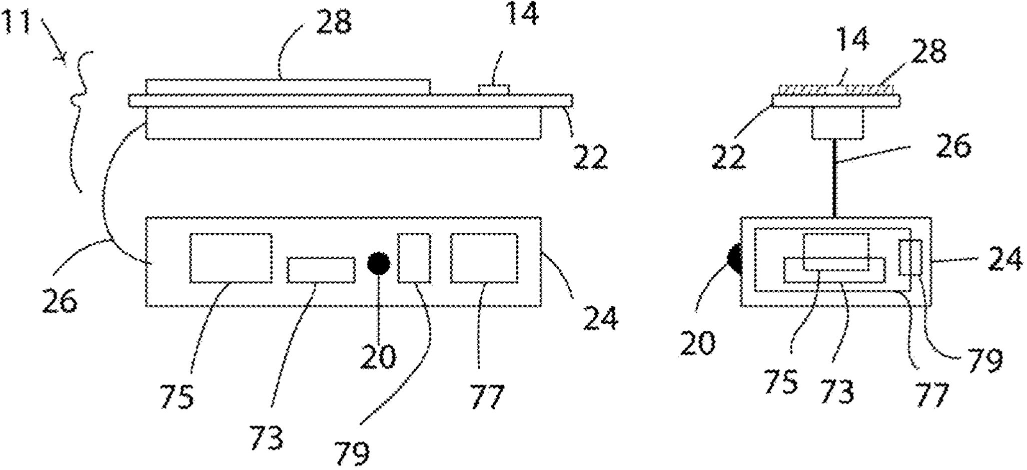
Figure 2C:
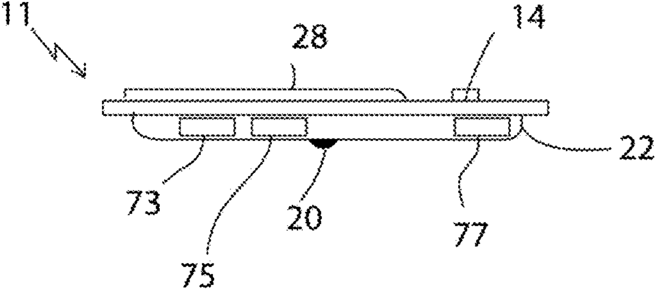
Figure 2D:
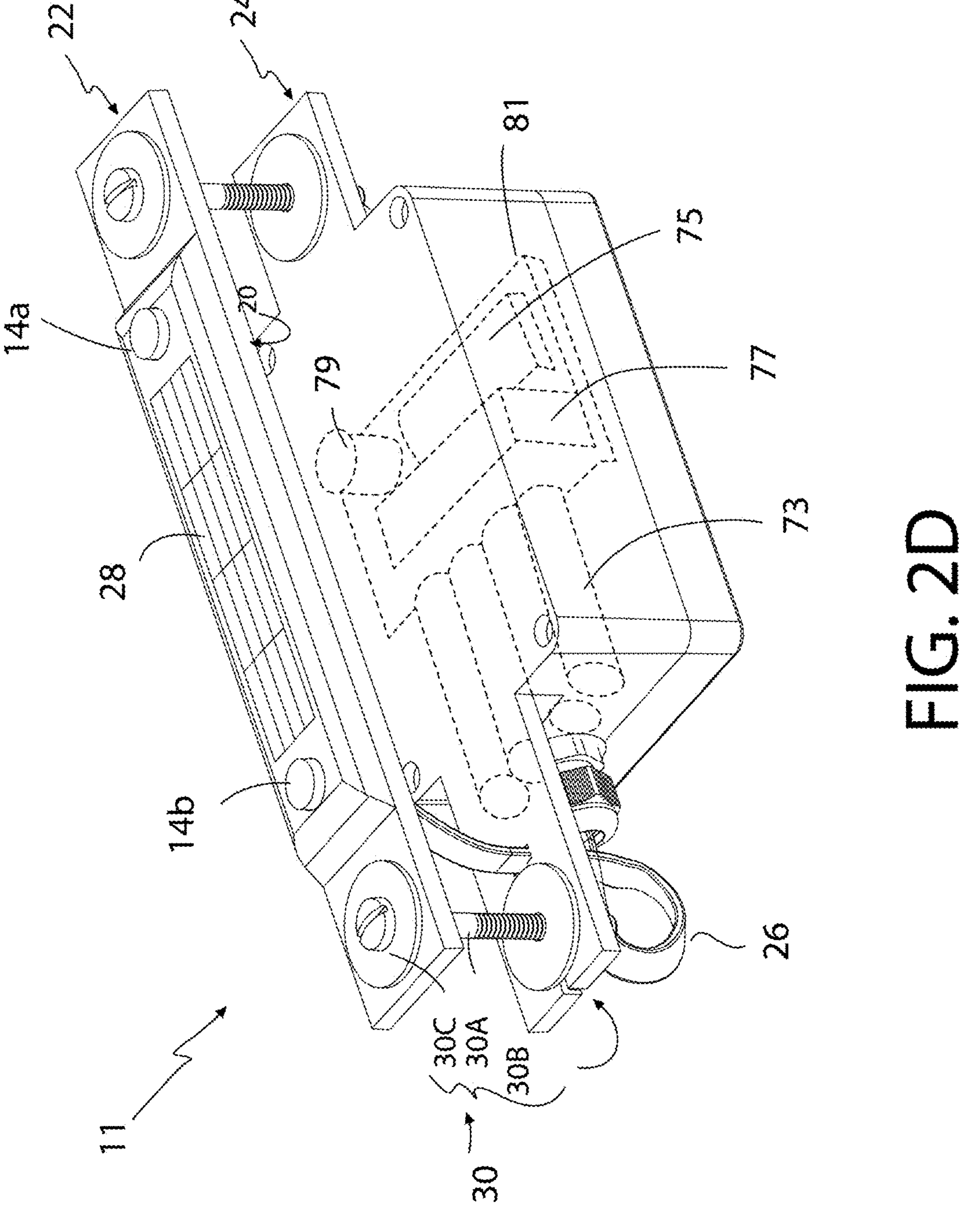
Figure 2F:
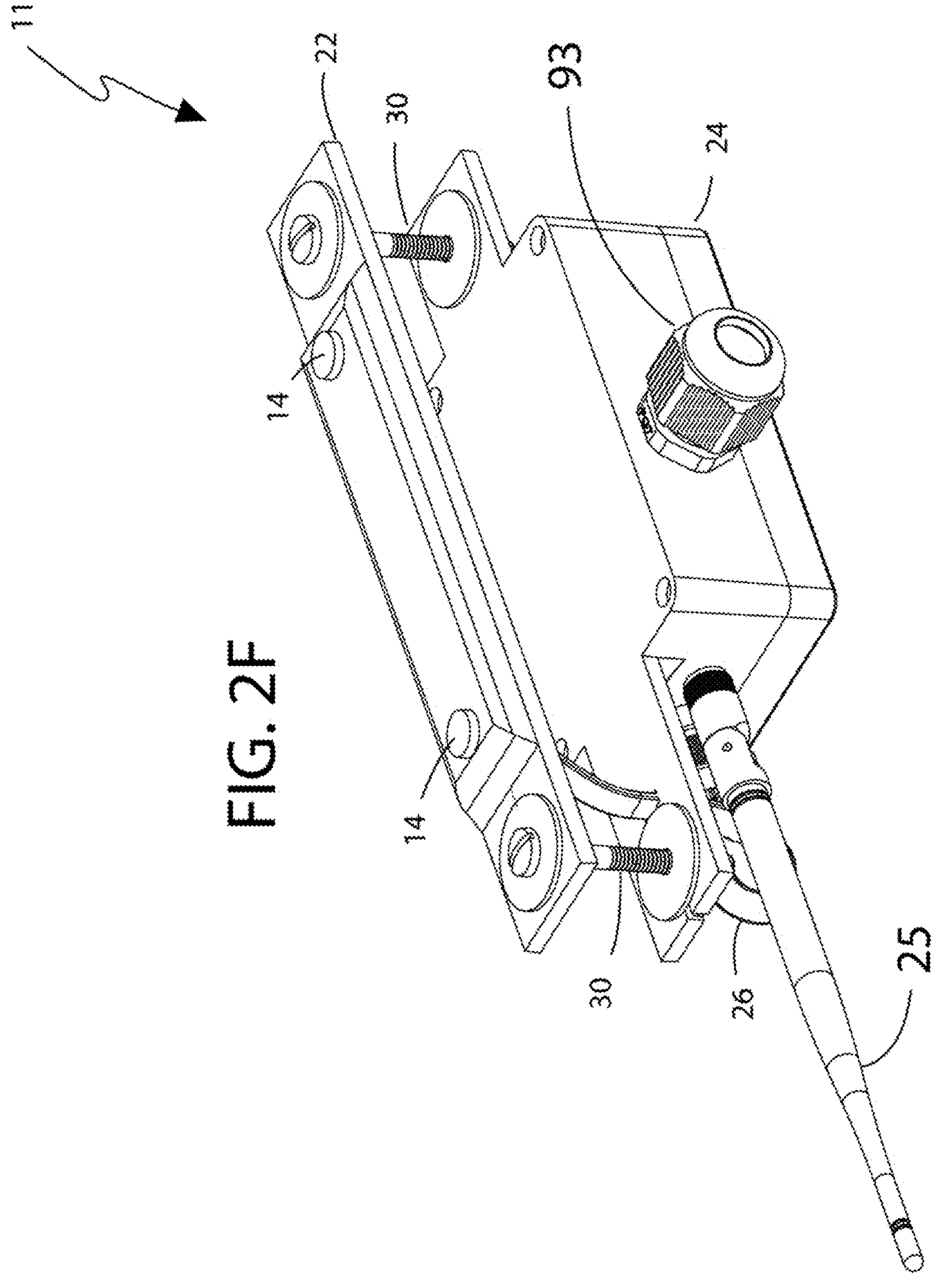

In some embodiments, operations related to sensing can include optionally utilizing output signals of one or more solar irradiance sensors 14, and output signals of the temperature measurement sensor 20. In some embodiments, the solar irradiance sensor 14 may comprise a silicon photodiode, for example a pyranometer or other suitable device, which operates to measure sunlight intensity. Such solar irradiance sensors 14 can be optionally configured to monitor various bandwidths of sunlight intensity. For example, in some embodiments, a single solar irradiance sensor 14 can be configured to measure sunlight intensity at a specific wavelength or over a range of wavelengths. Similarly, in some embodiments, multiple solar irradiance sensors 14*a*, 14*b*, as shown in FIGS. 2B, 2D, 2F can be configured to measure sunlight intensity at a specific wavelength or over a range of wavelengths.

Figure 2G:
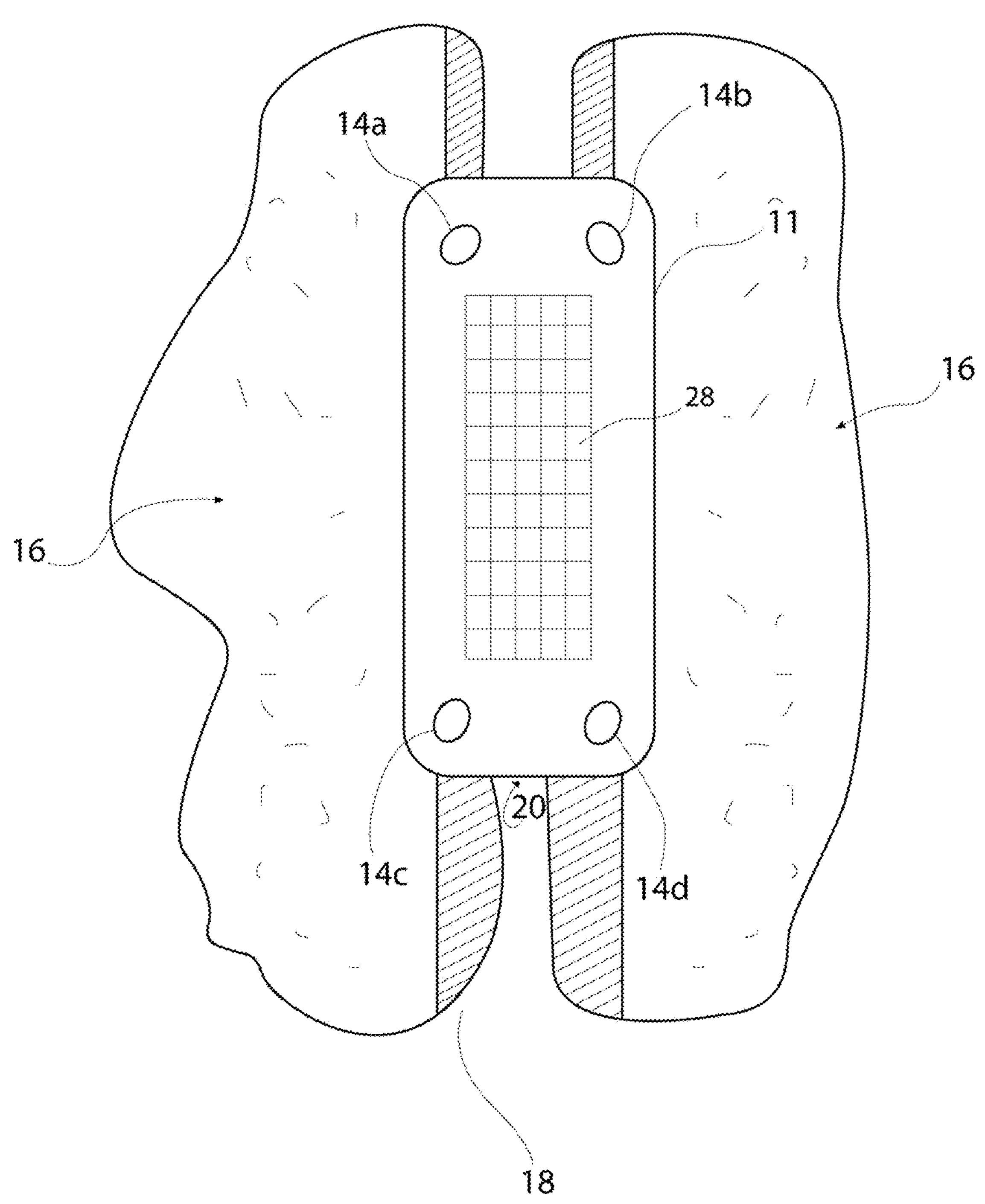

In some embodiments, a first solar irradiance sensor 14*a* can be configured to measure sunlight intensity at a first wavelength and a second solar irradiance sensor 14*b* can be configured to measure sunlight intensity at a second wavelength. In some embodiments, further solar irradiance sensors, for example, third and fourth, or more, solar irradiance sensors 14*c*, 14*d*, as shown in FIG. 2G, can be configured to measure sunlight intensity at third and fourth, or more, wavelengths.

In some embodiments, a first solar irradiance sensor 14*a* can be configured to measure sunlight intensity at a first range of wavelengths and a second solar irradiance sensor 14*b* can be configured to measure sunlight intensity at a second range of wavelengths. In some embodiments, further solar irradiance sensors, for example, third and fourth, or more, solar irradiance sensors 14*c*, 14*d*, can be configured to measure sunlight intensity at third and fourth, or more, ranges of wavelengths.

In some embodiments, a first solar irradiance sensor 14*a* can be configured to measure sunlight intensity at a first wavelength and a second solar irradiance sensor 14*b* can be configured to measure sunlight intensity at a second range of wavelengths.

In some embodiments, a first solar irradiance sensor 14*a* can be configured to measure sunlight intensity at a first wavelength or first range of wavelengths and a second solar irradiance sensor 14*b* can be configured to measure sunlight intensity at a second wavelength or second range of wavelengths, wherein the first and second wavelength or first and second range of wavelengths are substantially equal. In such a configuration, redundancy of the solar irradiance sensors 14*a*, 14*b* accommodates certain situations where such redundancy to help to maintain system efficacy. For example, redundancy of the solar irradiance sensors 14*a*, 14*b* can maintain system efficacy where one of the multiple irradiance sensors has a foreign substance blocking its outer surface, or where one of the multiple irradiance sensors malfunctions.

In some embodiments, the solar irradiance sensor 14 can be mounted in a standardized packaging such that sunlight can be measured in the Plane of Array (POA) or at an angle normal to the face of a solar module 16 or panel surface to which the smart sensor device 11 is mounted. In this manner, the solar irradiance sensor 14 experiences sunlight exposure that is similar to the exposure experienced by the neighboring solar modules 16. For example, one or more solar irradiance sensors 14 can be positioned on the smart sensor device 11, in turn positioned on the solar panels 16, as shown in FIG. 2A. In this manner, the orientation of the solar irradiance sensor 14 is substantially orthogonal to the plane in which the top surfaces of the solar panels 16 lie. Accordingly, the solar irradiance sensor 14 is equally subject to the same environmental factors as the solar panels 16, such environmental factors as shade, snow, soiling by leaves, dirt, bird droppings, and the like.

In some embodiments, for example in a case where multiple, for example two or more, solar irradiance sensors 14 are employed, such as in the embodiments of 2D, 2E, 2F and 2G, an average of the irradiance values received by the multiple irradiance sensors can be calculated to provide the irradiance measurement. In such an embodiment, the average irradiance value received by the multiple irradiance sensors known to be functioning properly can be calculated and used to provide the irradiance measurement.

Figure 10A:
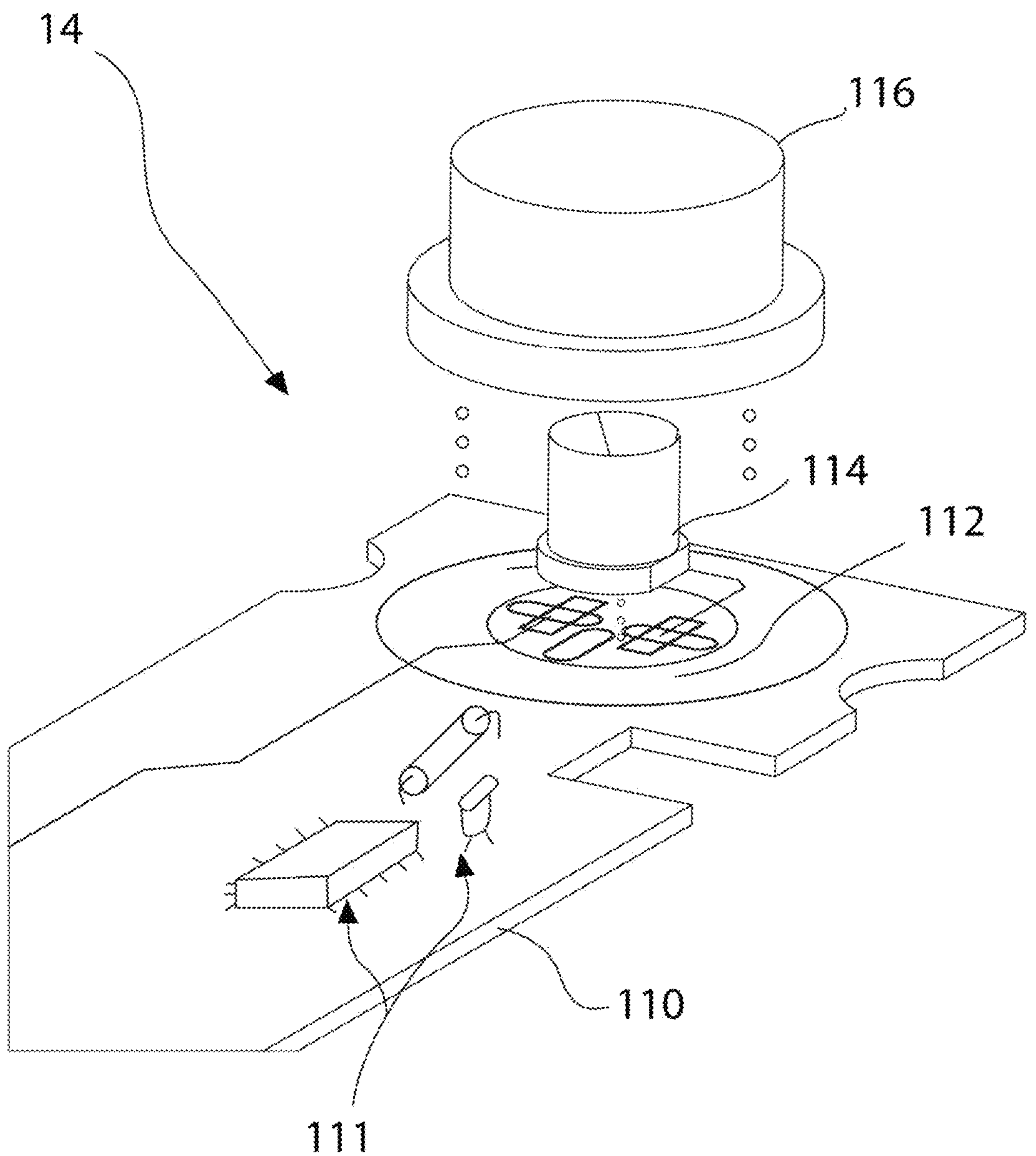
FIGS. 10A, 10B, 10C, 10D, 10E, 10F and 10G depict various aspects of irradiance sensor devices in accordance with exemplary embodiments of the present inventive concepts.

Referring to the exploded perspective view of FIG. 10A, in some embodiments, a solar irradiance sensor 14 may comprise a diffuser 116, one or more photodiodes 114, and supporting electronics 110. The diffuser 116 is configured to receive incident light and present the incident sunlight to one or more light capturing devices, for example, photodiodes. The one or more photodiodes 114 are configured to convert the received and diffused incident sunlight into a voltage or current signal. The supporting electronics are provided on a circuit board 110. In some embodiments, for example in the embodiments of FIGS. 2D, 2E, 2F and 2G, the circuit board 110 may be configured to have mounted thereto one or more solar irradiance sensors 14, each associated with a photodiode 114. In some embodiments where multiple solar irradiance sensors 14 are included, the multiple photodiodes 114 can each have a different and unique frequency response characteristic. Such a multiple-photodiode configuration can allow for the mathematical combination of the sensitivity of multiple irradiance sensors 14, such as averaging, across a broad light spectrum to reduce spectral error, to give results comparable to those provided by a broadband thermopile, while using a combination of components that are relatively simpler in design and sensitivity, and therefore cost.

In some embodiments, the circuit board 110 is constructed and arranged to include a connector pattern, referred to herein as a photodiode pad 112, arranged to accept multiple types and configurations of photodiodes 114. Such photodiodes can include photodiodes formed of, in various examples, amorphous silicon, indium gallium arsenide, gallium arsenide phosphide, and the like. Such photodiodes of different types can be of different configurations, sizes, and lead footprints, which can be accommodated by the photodiode pad 112 arrangement. In this manner, a single circuit board 110 can be manufactured in a manner so as to be compatible with solar irradiance sensors 14 that employ any of a number of different photodiodes. This eases the burden on manufacturing costs, and allows for a single circuit board platform 110 to be adaptable to a range of different applications. An optimal photodiode 114 for a solar irradiance sensor can be selected for a given application and applied to a standardized circuit board 110.

In some embodiments, each irradiance sensor 14 includes a diffuser 116 and a corresponding single photodiode 114 mounted to the photodiode pad 112. As shown and described herein in connection with the embodiments of FIGS. 2C, 2D, 2F, and 2G, for example, multiple irradiance sensors 14*a*, 14*b* can be configured on the same circuit board 110 or otherwise included in the same smart sensor device 11. Assuming corresponding photodiode pads 112*a*, 112*b* are included with each solar irradiance sensor 14*a*, 14*b*, then, in some embodiments, different types of photodiodes 114*a*, 114*b* may be positioned on the different photodiode pads 112*a*, 112*b*. As described herein, assuming each photodiode 114*a*, 114*b* is sensitive to a different wavelength of light or a different spectrum of wavelengths of light, then those different wavelengths or spectrums of wavelengths can be considered when computing an irradiance value for the smart sensor device 11. In addition different types or different geometric arrangements of diffusers 116*a*, 116*b* can be employed for similar reasons.

Further, in a case where multiple solar irradiance sensors 14*a*, 14*b*, are included in the smart sensor device, and the same type of diffuser 116*a*, 116*b*, and photodiode 114*a*, 114*b* is employed, such a configuration allows for the capability to remotely manage an individual solar irradiance sensor 14*a*, 14*b* that may become inoperative or inaccurate due to soiling and sensor drifting. In such a case, the smart sensor device 11 may be re-programmed, for example, to inactivate the bad sensor, or to bias or weight the sensor reading of an operational sensor over that of an underperforming sensor.

Figures 10B, 10C, 10D, 10E:
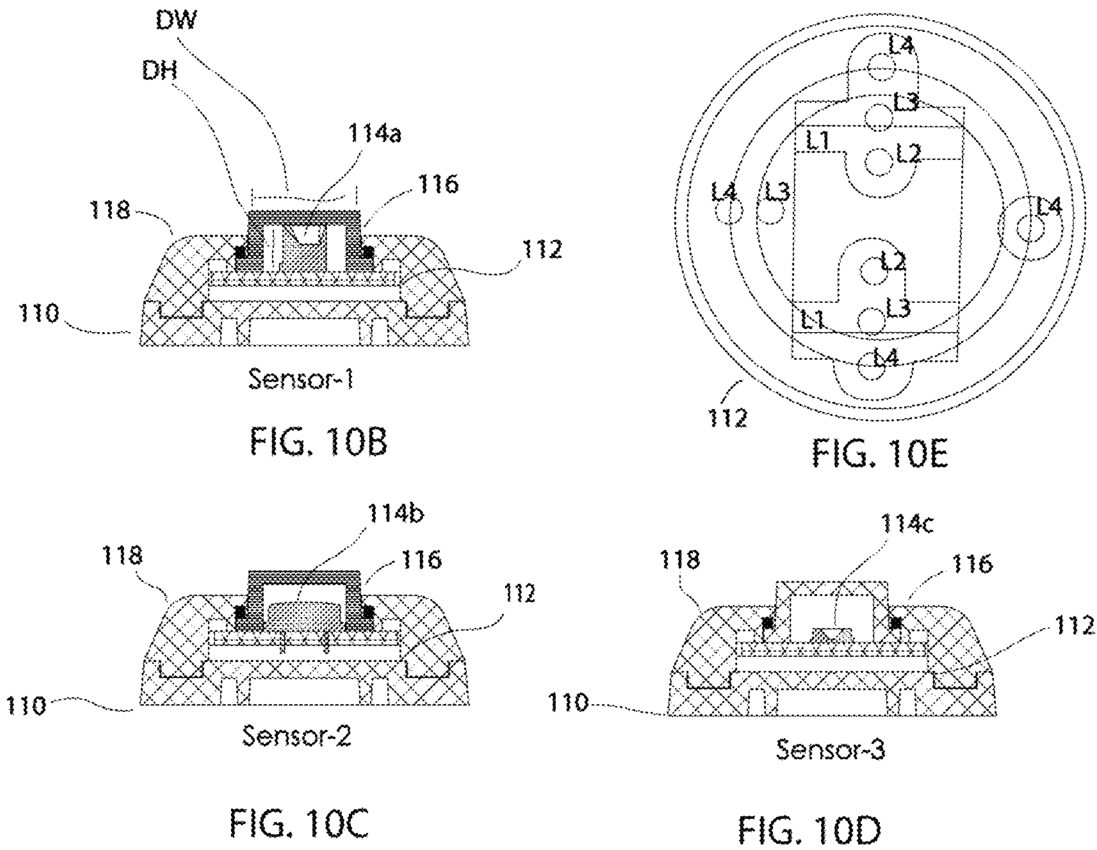

As described herein, photodiode pad 112 comprises a location at the circuit board 110 at which the photodiodes 114 are electrically connected to the circuit board 110 and supporting electronics 111. Referring again to FIGS. 10A, 10B, 10C, 10D and 10E there are depicted in exploded perspective view, cross-sectional view and planar view, exemplary embodiments of solar irradiance sensor devices in accordance with the present inventive concepts. As seen in FIG. 10A, the circuit board 110 for mounting in or on device platform 22 may contain a universal photodiode pad 112 (depicted in more detail in FIG. 10E) that allows the electrical connection of four or more different types of photodiodes 114 to the circuit board 110. Depicted in FIG. 10A is an example of one type of photodiode, namely, an Amorphous Silicon (a-Si) photodiode. As seen in FIGS. 10B, 10C and 10D photodiodes 114 can be of various shapes and sizes, including surface mount photodiodes, thru-hole mount photodiodes, and others. Diffuser 116 is a universal diffuser which covers photodiodes 114 for measuring various light attributes with cap 118 providing covering protection. In some embodiments, and with reference to FIG. 10B, the diffuser 116 has a sufficient inner height $D_H$ and a sufficient inner width $D_W$ so that is of sufficient size to house different types of system-compatible photodiodes 114*a*, 114*b*, 114*c* of different heights and widths. In particular, the inner height $D_H$ of the diffuser 116 is selected to be sufficient for the system-compatible photodiode of the greatest anticipated height, in this example, the photodiode of FIG. 10B. At the same time, the inner width $D_W$ of the diffuser 116 is selected to be sufficient for the system-compatible photodiode of the greatest anticipated width, in this example, the photodiode of FIG. 10C. As seen in FIG. 10E the surface of universal photodiode pad 112 includes various electrical contact locations L1. L2, L3, L4 for mounting various photodiodes 114. For example, an a-Si surface mount photodiode could be mounted in pad area L1, an InGaAs thru-hole mount photodiode could be located in pad area L2, an a-Si thru-hole mount photodiode could be located in pad area L3, and a GaAsP thru-hole mount photodiode could be located in pad area L4.

Figure 10F:
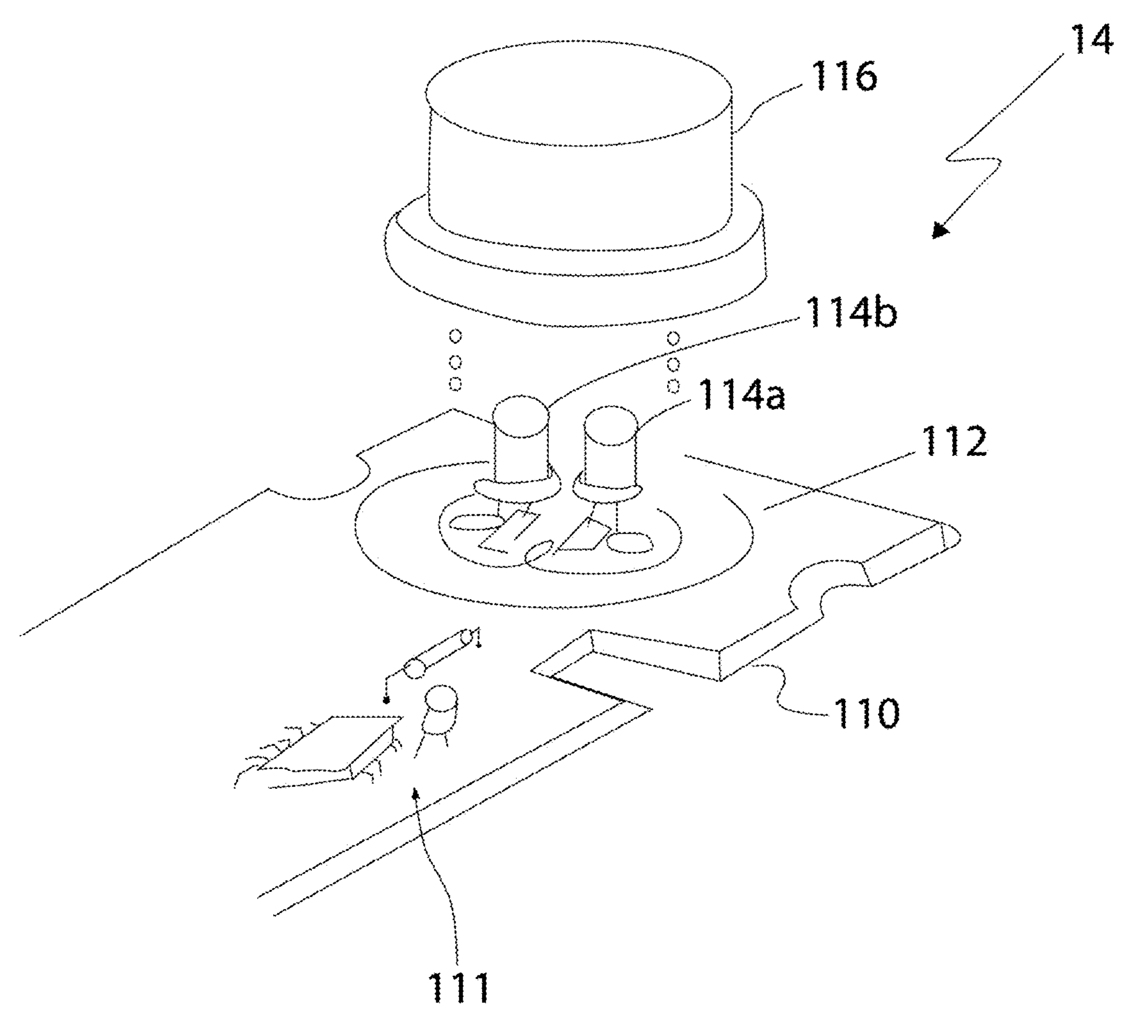
Figure 10G:
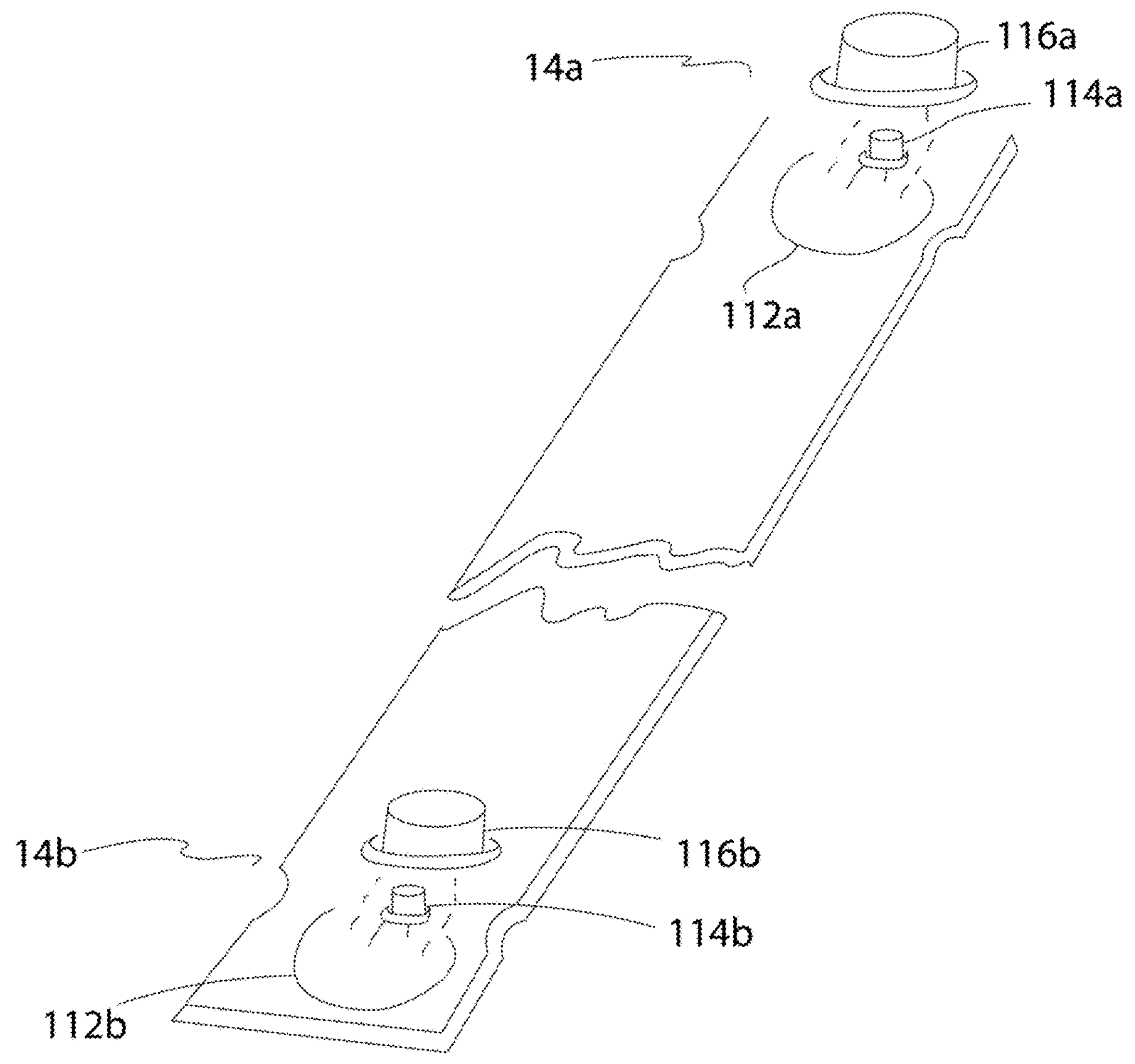

With reference to FIG. 10F, in some embodiments, an irradiance sensor 14 includes a diffuser 116 and multiple photodiodes 114*a*, 114*b* mounted to the photodiode pad 112 and positioned under the same diffuser 116. In the case of multiple photodiodes 114*a*, 114*b* mounted under the same diffuser 116, in some embodiments, the multiple photodiodes 114*a*, 114*b* are of the same type and are provided for redundancy. Accordingly, detection electronics remote the smart sensor device 11 can remotely deactivate an underperforming one 114*a* of the photodiodes and activate a redundant operational one 114*b* of the photodiodes to thereby expand the longevity of the smart sensor device 11. In the case of multiple photodiodes 114*a*, 114*b* mounted under the same diffuser 116, in some embodiments, the multiple photodiodes 114*a*, 114*b* can be of different types and are provided for sensing different wavelengths or ranges of wavelengths of sunlight incident on the shared diffuser 116.

In some embodiments the primary platform 22, the secondary device platform 24, or both 22, 24. may include one or more electrical connectors 93 (see FIG. 2F, for example) for the attachment of a third-party sensor 91 (see FIG. 4), for example, a pyranometer, temperature sensor, or other weather measurement device for measuring, processing, and recording data in a manner similar to the solar irradiance sensor 14 or the temperature sensor of the smart sensor device 11.

In some embodiments the use of a third-party sensor 91, such as a pyranometer, may be used in the calibration process of the solar irradiance sensor 14 or the temperature sensor 20, or both. In such an embodiments, the third-party sensor 91 may operate as a reference measurement and allow the further improvement of device sensitivity for the purpose of calibrating the sensors 14, 20. Such computation of calibration factors be completed on-board the smart sensor device 11 or remotely. Adjustments to the operating parameters of the device, including calibration factors, may be made locally or remotely to the smart sensor device 11.

FIGS. 11A, 11B and 11C are top-perspective, side and top views respectively of an embodiment of the primary device platform 22, in accordance with the present inventive concepts. In this view, it can be seen that the primary device platform 22 has a width 22W in the direction of the x-axis, a length 22L in the direction of the y-axis and a height 22H in the direction of the z-axis. For purposes of this embodiment, the width 22W of the primary device platform 22 is determined as its maximum width in the in direction of the x-axis. For purposes of this embodiment, the height 22H of the primary device platform 22 is determined as its maximum height in the direction of the z-axis. In particular, the height 22H is measured from a lower surface 122 at the underside of the primary device platform 22 at which the underside primary device platform is configured to make contact with a top surface of a solar panel to which the primary device platform 22 is to be mounted to an uppermost surface of the primary device platform 22 and any device components mounted thereto. In this example embodiment the uppermost surface comprises the uppermost surface of the solar irradiance sensors 14, as the diffuser component of the sensors 14 extends above a top surface of the chassis of the primary device platform 22; therefore, the height 22H of the primary device platform 22 in this case is measured as the distance between the lower surface 122 thereof to a top surface of the solar irradiance sensors 14. In some embodiments, the width 22W of the primary device platform is 1.5 inches, the length 22L of the primary device platform 22 is 10 inches, and the height of the primary device platform 22H, including the extension of the solar irradiance sensors 14 is 0.62 inches. In some embodiments, the width 22W of the primary device platform is 1.5 inches, the length 22L of the primary device platform 22 is 10 inches, and the height of the primary device platform 22H, including the extension of the solar irradiance sensors 14 is 0.5 inches.

With this explanation of terms in mind, in some embodiments, the width 22W of the primary device platform 22 is greater than or equal to two times the height 22H of the primary device platform 22. Alternatively, in some embodiments, the width 22W of the primary device platform 22 is greater than or equal to three times the height 22H of the primary device platform 22. Assuming such a ratio of width 22W to height 22H, the configuration of the primary device platform 22 is managed to have a relatively low profile. Accordingly, shadowing of solar cells of neighboring solar panels 16 to which the primary device platform is mounted is mitigated or eliminated, and system efficiency is not adversely affected by the presence of the smart sensor device 11.

In some embodiments, the temperature measurement sensor 20 may comprise a thermocouple, or other suitable device, suitable for measuring ambient temperature. As seen in the embodiments of FIGS. 2B, 2C, 2D and 2E(2), and 2H and in drawings of other embodiments, the temperature sensor 20, can be attached to the smart sensor devices 11, either on the primary device platform 22 as seen in embodiment of FIG. 2C or on the secondary device platform 24, to allow for a measurement of ambient air temperature to be taken at a position that is out of direct sunlight. The measurements taken by the smart sensor device components can be utilized to determine the solar intensity and the calculated solar cell temperature, two variables from which a determination of expected power output of the modules 16 can optionally be determined.

In some embodiments, the composition of the primary platform 22 and the secondary platform 24 comprises a molded polycarbonate material. In some embodiments, each platform 22, 24 includes a base and a cap that encompass a volume therebetween. The base and cap can be sealed relative to each other to resist entry of moisture. Componentry including the circuit board 110, sensors 14, 20, device solar array 28, power source 73, processor 75, capacitor 79 and transceiver 77 are positioned in the sealed volume of the platform 22, 24. Gasketing can be positioned at the interface of the diffuser of the solar irradiance sensor 14 and the upper surface of the primary device platform 22 to resist entry of moisture through that interface. In some embodiments the material of the primary and secondary platforms 22, 24 is transparent to the wavelengths of incident sunlight. In this manner, heating of the smart sensor device 11 can be mitigated. In addition, the use of transparent material allows for a pass-through of incident sunlight to the solar array 28 of the smart sensor device 11 so as to optimize power generation by the solar array 28. Further, the use of transparent material allows for visual inspection of the componentry contained therein, which may include LED visual indicators.

Referring to FIG. 2D, in exemplary embodiments of the smart sensor devices that include both a primary device platform 22 and a secondary device platform 24, mounting rods 30 can be provided to allow device the primary platform 22 to be mounted on at a first, upper, surface of the solar array panels 16 (see FIG. 4), while the secondary platform 24 can be spaced apart from the primary device platform 22 and mounted on to a second, opposing, lower side of the solar array panels 16. In some embodiments, the mounting rods 30 can be coupled between the primary platform 22 and secondary platform 24 using bolts 30A, mating nuts 30B and washers 30C, as shown in FIG. 2E(2). The bolts 30A are positioned through corresponding openings 31 in the primary and secondary platforms 22, 24. The mounting rods 30 and cable 26 are sufficiently narrow so as to fit in the gap 18 present between neighboring solar panels 18 to which the smart sensor device 11 is mounted. At the same time, the primary and secondary device platforms 22, 24 and washers 30C are sufficiently wide so they overlap neighboring panels 18.

Figure 2H:
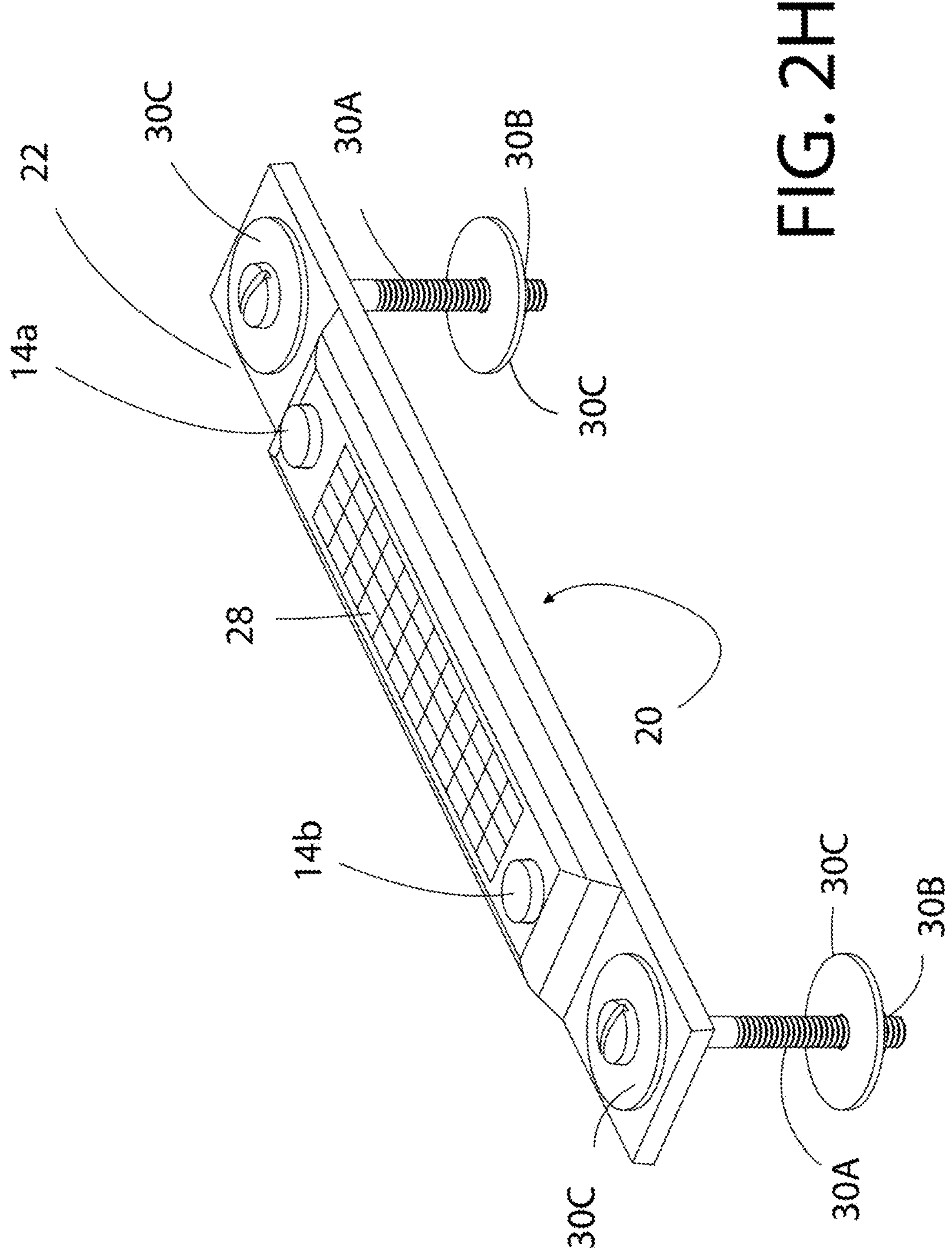

FIG. 2H is a perspective view of an embodiment of the smart sensor device 11 in accordance with the inventive concepts. In the embodiment of, FIG. 2H the smart sensor device 11 includes only the primary platform 22 and does not include the secondary platform. In a manner similar to the embodiment depicted in FIG. 2C, the primary platform 22 of the embodiment of FIG. 2H can include all components required for the sensing, processing and transmission operations, and therefore, the secondary platform is not required. With reference to FIG. 2C, such components included in the primary platform 22 can include one or more of the solar irradiance sensor 14, the device solar array 28, the power source 73, the processor 75, the transceiver 77, the capacitor 79, and the circuit board 81, 110. Coupling mechanism 30 in this embodiment includes washers 30C of sufficient width to communicate with undersides of neighboring solar panels 16. Other mechanical coupling mechanisms are equally applicable to the present inventive concepts.

In some embodiments, for example in the embodiments depicted at FIGS. 2E(1)-(3) a cable gland 27 can be coupled to a wall of the housing of the primary or secondary device platforms to serve as a moisture-proof via for wire or cable systems, for example, power cables, Ethernet cables, or custom communication signal cables.

Figure 3A:
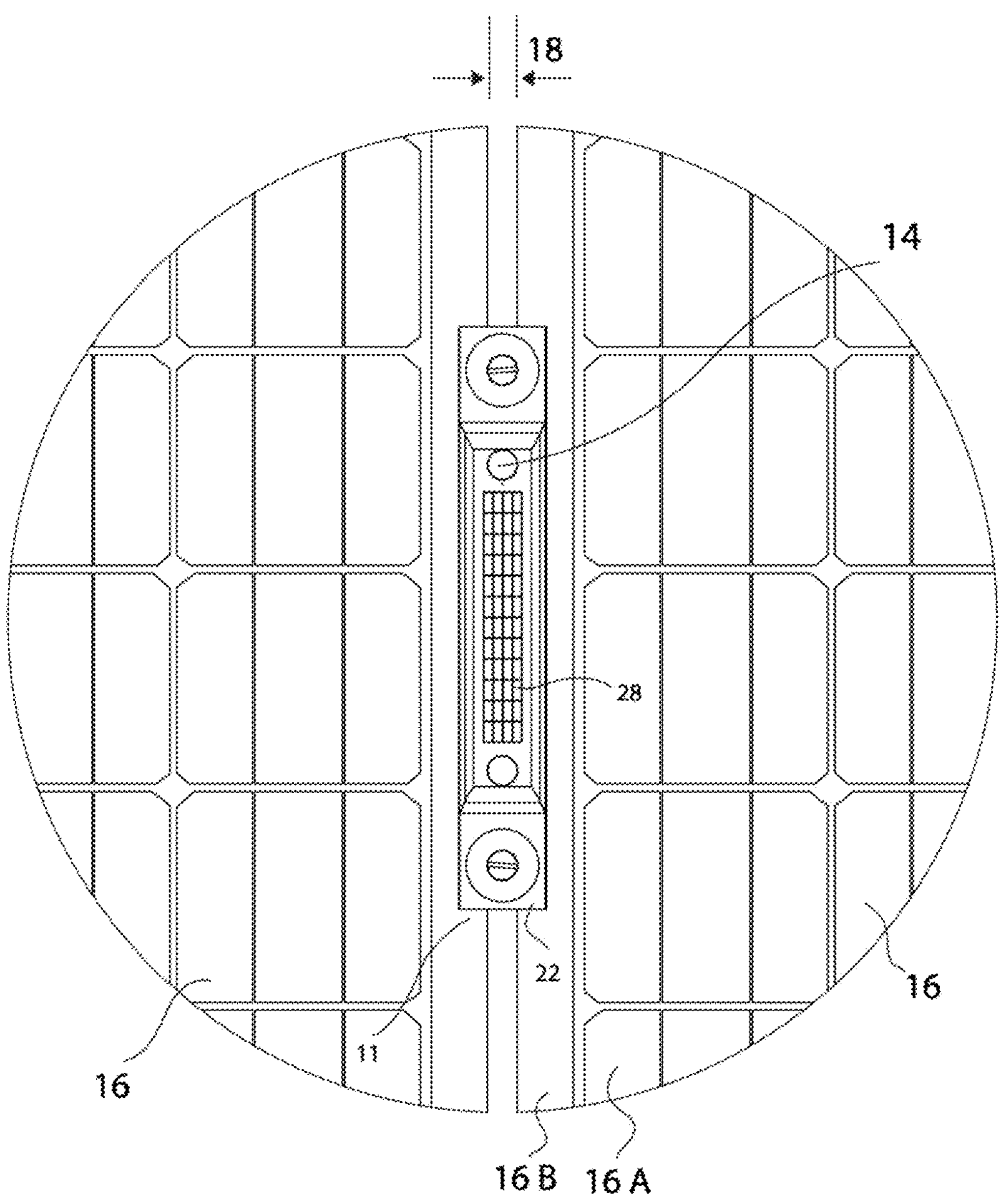
FIGS. 3A and 3B are top and top perspective views respectively of a smart sensor device mounted between solar panels in accordance with an exemplary embodiment of the present inventive concepts.
Figure 3B:
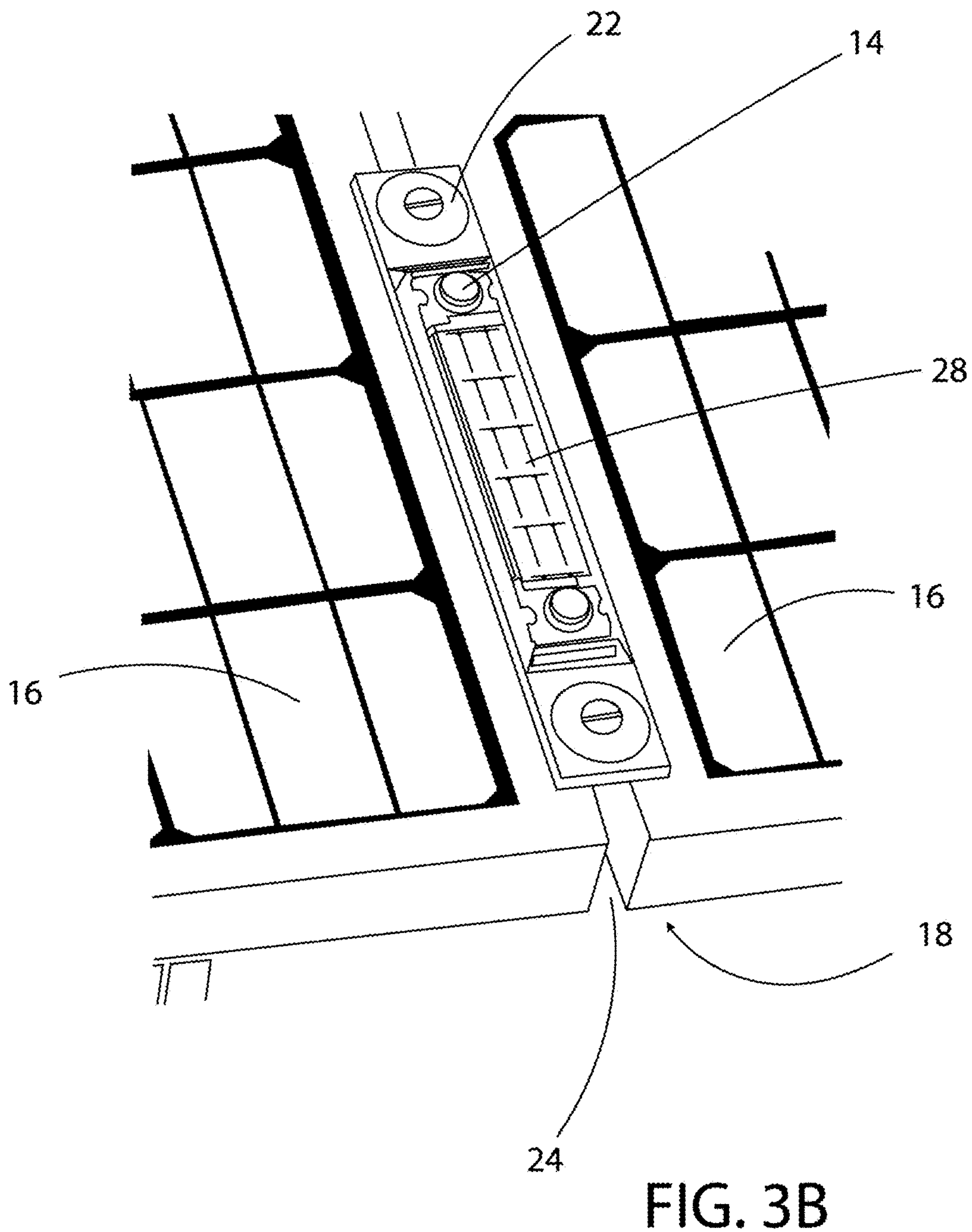

Referring to FIGS. 3A and 3B, an exemplary embodiment is shown wherein a smart sensor device 11 in accordance with the present inventive concepts is mounted between a pair of solar panels 16. In these depictions, it can be seen that the smart sensor device 11*s* constructed and arranged to be positioned between neighboring panels, with interfering with their operation, or minimizing interference with their operation. It can be seen that a typical solar panel 16 includes a frame 16B that extends around the perimeter of the panel, and solar cells 16A at the interior of the frame 16B. The panel frame 16B is typically 1" in width, and the primary device platform 22 is preferably of a width 22W so that it contacts exclusively the frame 16B and avoids interfering with the solar cells 16A when mounted. Neighboring solar panels are typically arranged to have a gap of greater than 0.25" to allow for thermal expansion and less than 1.5" to optimize density.

Apparatus and methods for computing the Denowatts™ calculation metric will now be described. Reference is made to the embodiment of FIG. 4A which provides a block diagram of an electronic system in accordance with embodiments of the present inventive concepts. In the embodiment of FIG. 4A, a smart sensor device 11 in accordance with embodiments of the inventive concepts includes one or more solar irradiance sensors 14 generating an irradiance signal 15 and one or more optional temperature sensors 20 generating a temperature signal 21. The irradiance signal 15 and the optional temperature signal 21 are provided 50 to a processor that is on-board the smart sensor device 11, in the sense that is co-located with the one or more solar irradiance sensors 14 and the one or more optional temperature sensors 20 on the primary device platform 22, secondary device platform 24, or both 22, 24. The on-board processor 50 operates to periodically calculate cumulative irradiance values 61 and Denowatts™ metric values 59 and stores the periodic values in a storage device 83 that is also on-board the smart sensor device 11, in the sense that the storage device 83 is co-located with the one or more solar irradiance sensors 14 and the one or more optional temperature sensors 20 on the primary device platform 22 secondary device platform 24, or both 22, 24. A data transmission system 65 periodically transmits the stored values to a remote receiver 67. The receiver 67 system may optionally include a gateway 69 to the Internet and related available storage facilities 71.

In some embodiments, an irradiance value is calculated 61 as a cumulative value of a total irradiance received over a time interval. In some embodiments, an output of the solar irradiance sensor 14 is in the form of an irradiance voltage signal 15 that varies in accordance with the intensity of sunlight received by the sensor 14. The irradiance voltage signal is input to the on-board processor 50 for calculating a cumulative irradiance value 61, based on the irradiance voltage signal 15. In some embodiments, a gain and an offset value are applied to the voltage signal received by the processor to provide an irradiance value. In such embodiments, a generally linear relationship exists between the voltage signal and the computed irradiance measurement Irr. The irradiance measurement Irr is computed by the processor periodically, for example every 5 seconds, and the collection of computed irradiance measurements Irr are stored by the processor for further processing.

In some embodiments where two or more solar irradiance sensors 14 are included and actively used, the voltage signals from each sensor can first be averaged to provide an average irradiance value. The average irradiance values are then compiled and used to generate the computed irradiance measurement Irr.

In other embodiments, as the voltage signals from each sensor can be weighted with respect to each other, and the weighted voltage signals used to generate the computed irradiance measurement Irr. For example the voltage signals can be weighted depending, for example, on the size of solar irradiance sensors 14, depending on the composition or technology of a given solar irradiance sensor 14 or depending on the known or suspected state of one or more of the sensors 14.

In the case where multiple irradiance sensors are deployed to measure wavelengths or ranges of wavelengths, the signals produced by the sensors 14 can be weighted, or factors applied, so that accurate combined value is provided.

In some embodiments, calibration of the solar irradiance sensor configuration can be completed by comparing the sensors 14 against calibrated, third-party reference sensors of similar spectral absorption.

In some embodiments, the computed irradiance measurements Irr are further processed to periodically compute a cumulative irradiance value Cumulative Irradiance. In some embodiments, this value can be computed as follows:

$$\text{Cumulative Irradiance} = \sum_1^n \left( \frac{Irr}{\left(\frac{1}{n}\right)(3600)(1000)} \right)$$

In this relationship, n represents the time sample interval, in terms of seconds and Irr represents the computed irradiance measurement provided by the solar irradiance sensor. Cumulative Irradiance is calculated in terms of sun-hours (1000 W/m$^2$) (1 hour) and is representative of the sum of irradiance measurements over the course of an hour.

In this manner, the Cumulative Irradiance can be computed, in some embodiments of the present inventive concepts using exclusively processing of the output signals of irradiance sensors 14. While conventional approaches utilize a temperature measurement, for example using a thermocouple, for the calculation of cumulative irradiance, embodiments of the present inventive concepts do not require such a temperature measurement, but instead can rely exclusively on the output of irradiance sensors.

As described herein the Denowatts™ metric value is representative of a simulated energy generation value. In some embodiments, the Denowatts™ metric value accounts for irradiance, temperature, system size, static system derating and dynamic system derating to provide a performance metric against which the performance of the solar collection system being monitored by the smart sensor device 11 can be gauged. In some embodiments, the Denowatts™ metric value is periodically calculated on-board the smart sensor device 11, which contains processing power sufficient to perform such computations. Denowatts™ metric values are stored and periodically transmitted to a receiver station. In this manner, raw irradiance data and, in some cases, raw temperature data, are processed locally using power-efficient processing equipment, and the number and duration of power-hungry transmission operations to the receiver station are minimized.

In some embodiments, the Denowatts™ metric values are periodically determined as follows:

$$Denowatts^{TM}\ metric = \sum_1^n \left( \frac{Irr(Pdc)(1 + \alpha((Tcell - 25)))}{\left(\frac{1}{n}\right)(3600)(1000)} \right)(\text{Derate Factor})$$

wherein:

$$Denowatts^{TM}\ metric \le Pac / \left(\frac{1}{n} * 3600\right)$$

ELSE $$Denowatts^{TM}\ metric = Pac / \left(\frac{1}{n} * 3600\right)$$

and wherein:

n: Time sample interval (seconds)
Irr: Computed Irradiance Measurement (computed above)
Pdc: DC Power Rating of the solar array
Pac: Maximum Output AC Power Rating of the solar array
α: Reference Module Temperature Coefficient (Power)
Tcell: Calculated Solar Cell Temperature may be calculated as $$Tcell = (Tdevice)(\delta(Irr) + \varepsilon)$$

wherein:

Tdevice: Device temperature recorded on the device platform
δ and ε: calculated constants related to a reference cell Static and Dynamic Derate Factors $$\text{Derate Factor} = \beta(\gamma)$$

wherein:

β: Static Derate Factor

γ: Dynamic Derate Factor described by one or more polynomial equation(s) derived from the operating efficiency of a reference inverter and other system characteristics relative to irradiance conditions.

Figure 4:
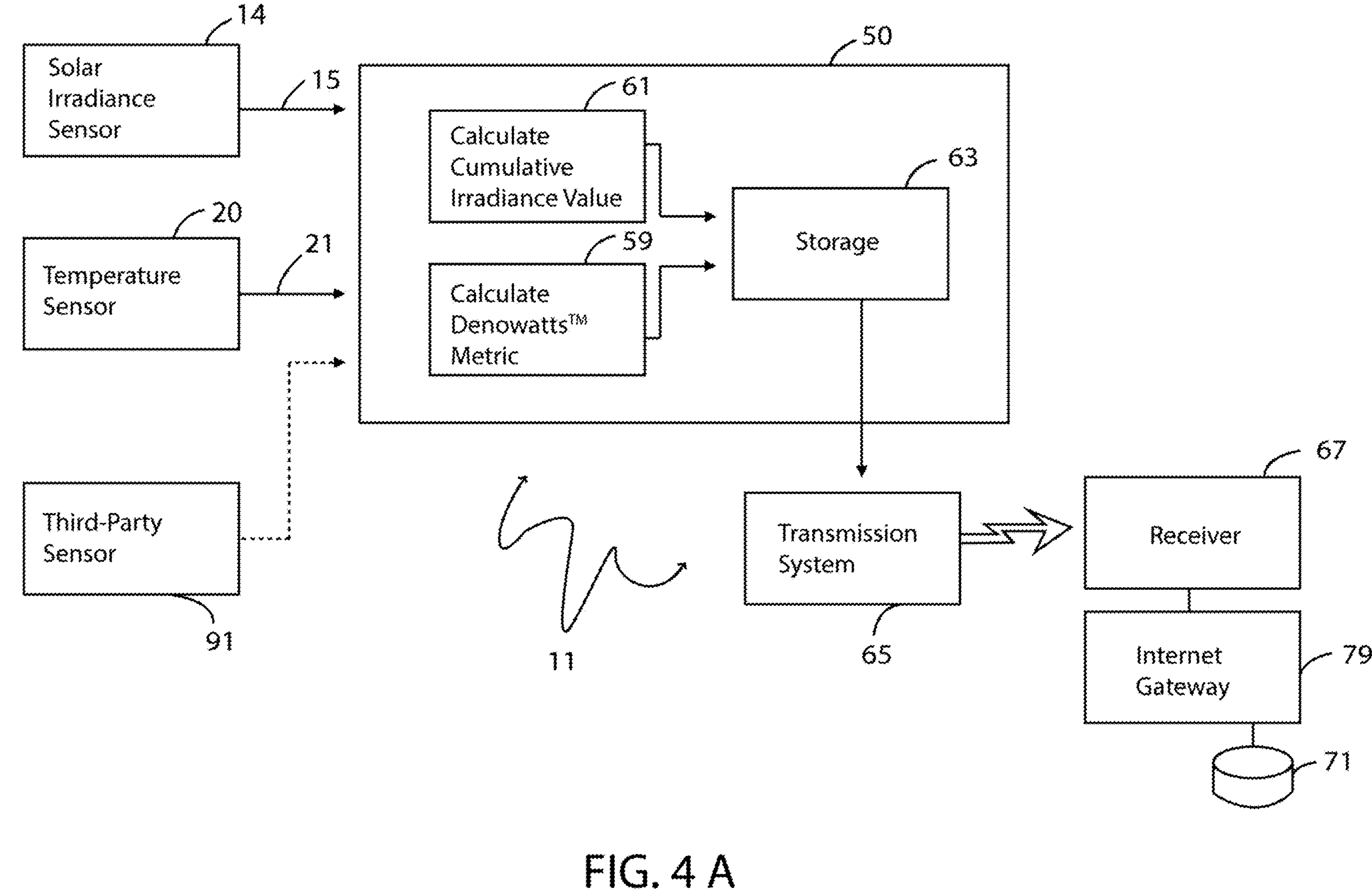
FIG. 4A is a simplified overview processing flow diagram in accordance with an exemplary embodiment of the present inventive concepts.
FIG. 4B is a simplified overview processing flow diagram of a Denowatts™ metric calculation, in accordance with an exemplary embodiment of the present inventive concepts.
Figure 4B:
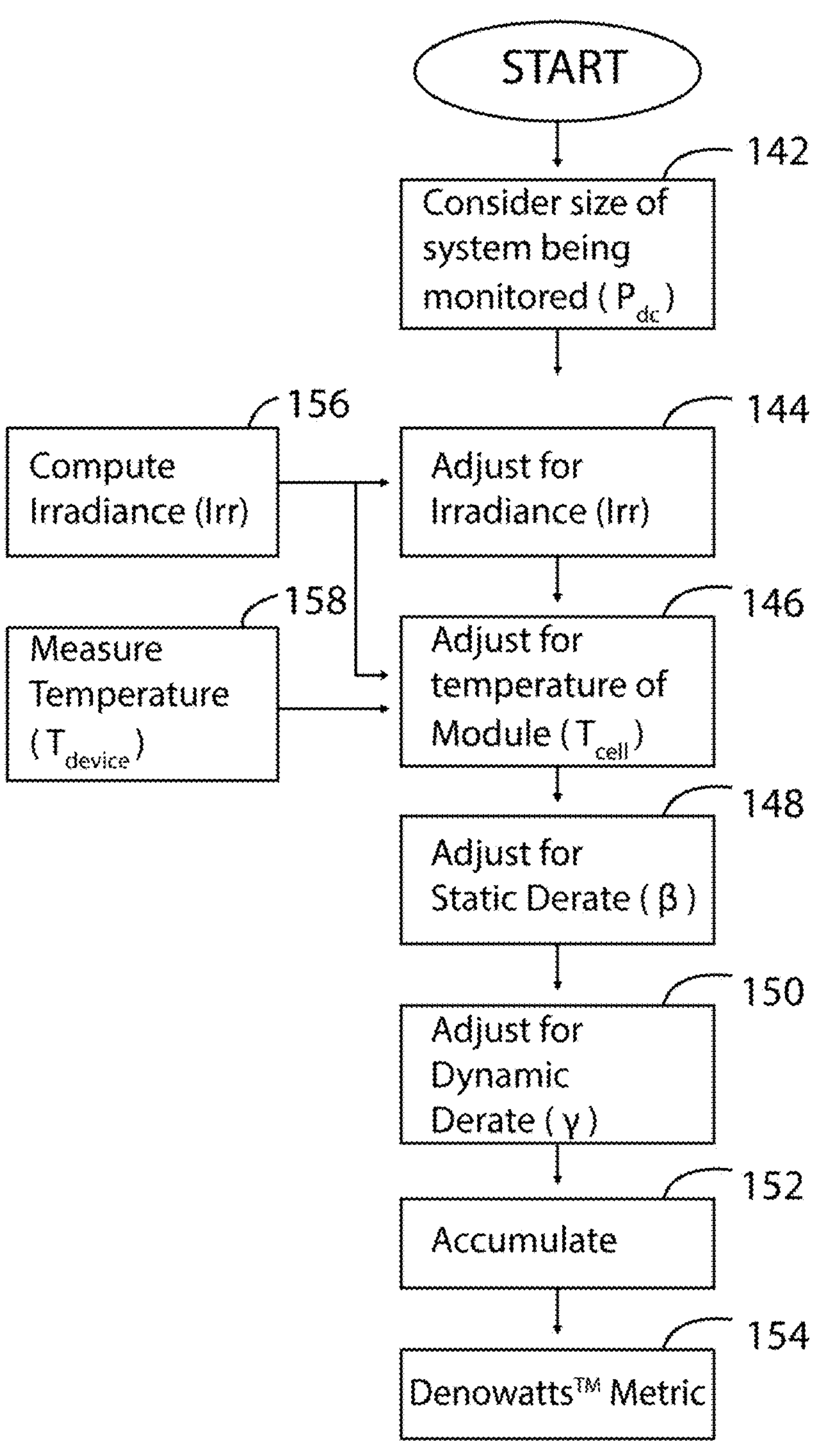

With reference to the flow diagram of FIG. 4B, and as described herein, the Denowatts™ metric calculation, referring to item 142, the parameter Pdc takes into account the size of the solar collection system being monitored. This is typically a known reference item for the system being monitored.

Referring to item 144 of FIG. 4B, the Computed Irradiance Measurement Irr, as measured by the one or more solar irradiance sensors 14 of the smart sensor 11 takes into account the amount of solar light energy incident on the monitored solar collection system. As described herein, the Computed Irradiance Measurement Irr can be determined by the processor 50 in response to the output signals of the irradiance sensors 14.

Referring to item 146 of FIG. 4B, an adjustment is made for the operational efficiency of the monitored solar collection system based on the measured temperature Tcell of the device 146, which in essence is a converted temperature measurement Tdevice taken by the temperature sensor 20 of the smart sensor 11, and which takes into account the Computed Irradiance Measurement Irr. For example, it is known that cells of a solar collection system operate with higher efficiency at lower temperatures; this measured temperature Tcell takes this into account.

Referring to item 148 of FIG. 4B, an adjustment is made for the static derate factor β of the monitored solar collection system. The static derate factor is a known factor for the system and takes into account power losses expected in the solar array, for example losses arising as a result of DC to AC conversion. Typically, the static derate factor β is on the order of about 0.9.

Figure 12:
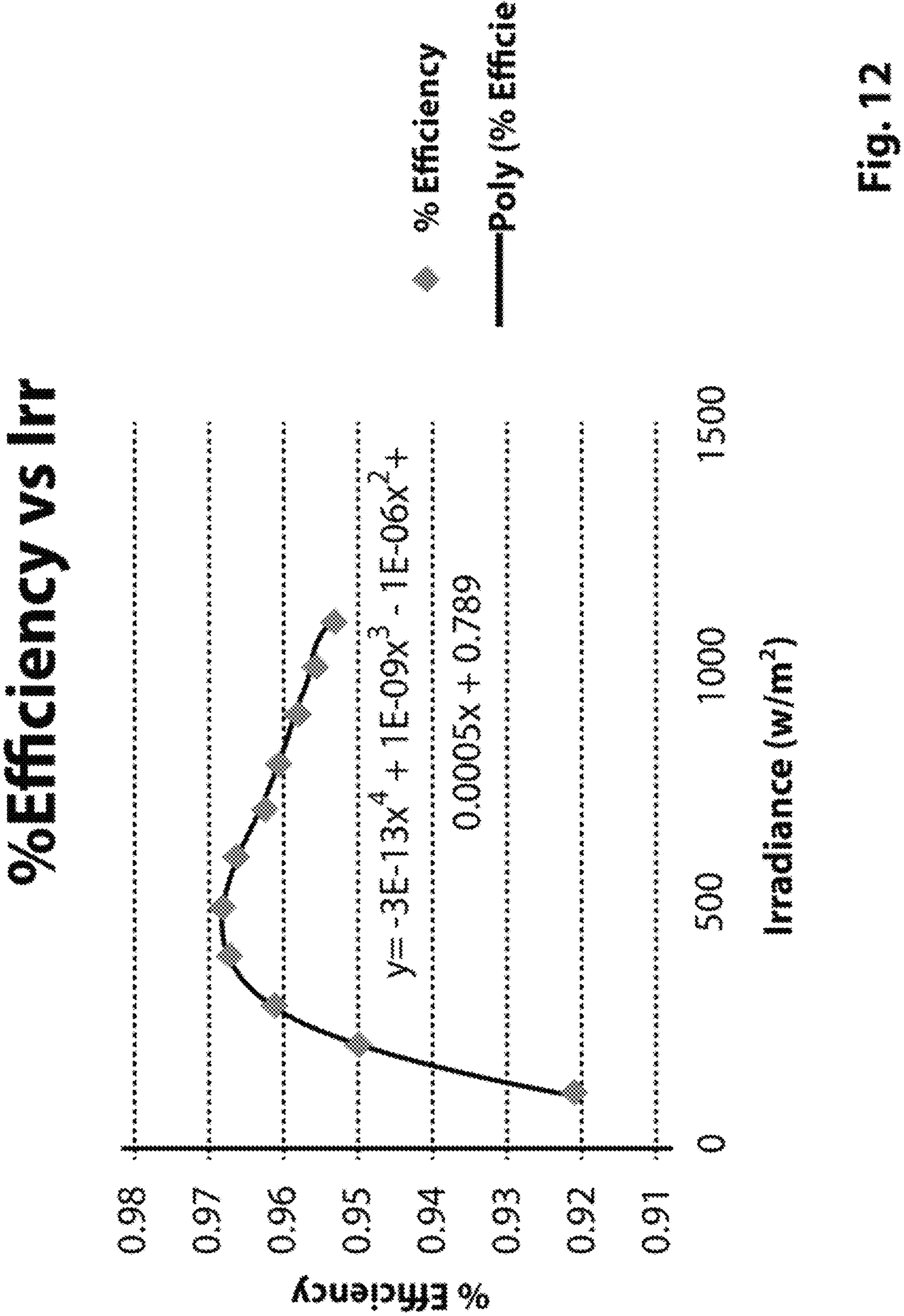
FIG. 12 is a chart of non-linear efficiency of a system inverter in response to system irradiance, in accordance with the present inventive concepts.

Referring to item 150 of FIG. 4B, an adjustment is made for the dynamic derate factor γ of the monitored solar collection system. The dynamic derate factor γ varies in response to irradiance Irr, and the response is typically non-linear. The dynamic derate factor γ relates to the efficiency of the system inverter used for DC to AC conversion in the monitored solar collection system. When operating low light levels, the system inverter tends to be less energy efficient than when operating at higher light levels. With reference to FIG. 12, the non-linear efficiency of a system inverter is charted in response to system irradiance Irr. In the example of FIG. 12, the behavior of system inverter efficiency (y) is graphed in response to irradiance approximates to the following polynomial:

$$y = -3E - 13x^4 + 1E - 9x^3 - 1E - 6x^2 + 0.0005x + 0.879$$

This formula is merely an example of the behavior of the dynamic derate factor and other non-linear approximations, and linear approximations, may equally apply to the determination of dynamic derate factor γ as used herein. Accordingly, the dynamic derate factor accommodates for system non-linear behavior, for example non-linear behavior in monitored system inverter for use in the calculation of the Denowatts™ metric. Consideration of dynamic derate factor in this manner provides for an exceptionally accurate modeling of the expected behavior of the modeled solar system. Increased accuracy from the use of the dynamic derating improves the accuracy at lower light levels and variable light levels relative to contemporary techniques which lose considerable accuracy at lower and variable light levels.

Referring to item 152 of FIG. 4B, the individual Denowatts™ metric values are accumulated, and periodically computed as a cumulative Denowatts™ metric for the system.

Under certain conditions, the thus computed cumulative Denowatts™ metric value may be determined to exceed the expected maximum output AC power rating of the solar array Pac. In such cases, the cumulative Denowatts™ metric value way be reduced to the expected maximum.

Readings may be then formatted into a data form that can be wirelessly transmitted to a receiver 67 and internet gateway 69 as depicted in FIG. 4. Additional features of the processor 50 can include the ability to be remotely programmed, including information related to sensor calibration constants and solar energy system characteristics, including AC nameplate value. In some embodiments, the processor can also be configured to store interval data as well as a cumulative output value. In some embodiments, the processor can be constructed and arranged to manage the power performance requirements of the smart sensor device in order to minimize smart sensor device energy usage and battery storage requirements and is suitable for on-board processing of data to minimize the amount of data transmitted to off-site software services. In accordance with embodiments of remote programmability, the transmission system 65 can comprise a receiving system suitable for receiving wireless or wired signals from an off-board or remote source.

The generating and reporting of the Cumulative Irradiance value allows for the measurement and recording of the available solar resource. This in turn allows for the calculation of the weather adjusted generation as modeled by a baseline energy simulation such as PVSyst, PVWatts, and others. By adjusting the amount of available irradiance, as measured in Sun-Hours, the expected energy generation may be adjusted linearly to answer a critical solar array owner's question "Is my solar array performing as it was expected to perform based on my baseline model?". An additional feature for generating and reporting Cumulative Irradiance on the smart sensor device 11 is that during times of external power or communications outages, the measurements and process continue to record this critical information.

The generating and reporting of the Cumulative Denowatts™ metric permits the measurement and recording of the reference array energy generation in order to calculate a comparable baseline. By comparing the actual solar array energy generation with the Cumulative Denowatts™ metric answers a solar array owner's question "Is my solar array performing as well as it could be relative to other similar solar arrays?". An additional feature of generating and reporting Cumulative Denowatts™ metric on-board the smart sensor device 11 is to ensure that in times of external power or communications outages that the measurements and process continue to record this critical information.

Exemplary embodiments related to transmitting can optionally include a radio (RF) frequency and/or cellular transmitter. In exemplary embodiments, the RF transmitter can be configured to employ a frequency that is best suited for long-distance, structural penetration (to include concrete and steel), and low power consumption. In exemplary embodiments, the smart sensor devices 11 can also incorporate an RF receiver unit 67, which may stand alone or be incorporated into an internet gateway equipment component. In exemplary embodiments, the RF receiver unit 67 can include both as RS-485 and Ethernet options for delivering the data from the smart sensor devices to an array of internet gateways 69 which are commercially available to connect to the internet. A 2-way system can be employed that allows for remote firmware updates as well as remote calibration, system information updates, and an instantaneous readout mechanism for near instantaneous readings, for example, during peak energy demand periods on the utility grid. In exemplary embodiments, referring to FIG. 2F, optional antenna 25 and supporting electronics can be included to extend transmission over 2500 feet.

Exemplary embodiments related to form factor can optionally include a universal mounting configuration with modules, a solar power charger for long-term augmentation of the self-contained power supply, integrated sensors that allow a standardized installation, or an onboard antennae for long-range wireless transmission (RF or cellular).

Exemplary embodiments related to the usage of generated data include a ratio that is defined by the solar power system recorded generation output ("Numerator") divided by the smart sensor device Output value ("Denominator") during congruous time intervals. Such a ratio can be the basis for a smart sensor device Performance Index Factor which is used to track and communicate performance. The smart sensor device Performance Index Factor may be defined as the Solar Array Actual Generation divided by the smart sensor device Output cumulated during a concurrent time period and may be calculated as follows:

$$\text{Factor} = \text{Actual Generation}/\text{Device Output}$$

In a typical day, much like the solar array on which exemplary embodiments of the smart sensor devices can be implemented, the smart sensor devices can have different time-based "mode of operation". For example, the smart sensor devices can be configured to "sleep" at night to conserve power and to "wake up" at a time when solar energy can be generated. During night conditions, the smart sensor devices can log data less frequently, for example at a frequency of once per hour and transmit less frequently, for example every 6 hours. In some embodiments, during a "sleep mode", the Denowatts™ calculation is not calculated when the intensity level is determined to be below 10 $w/m^2$. During twilight conditions (10-40 $w/m^2$) the smart sensor devices can "wake up" and sample data at a rate that is reduced relative to fully operational mode, yet is greater than sleep mode, for example every 30 seconds. Data can be transmitted at a similarly reduced rate, for example every 6 minutes. At such a twilight light level a typical inverter will begin to generate energy. During high sun conditions the smart sensor device can sample data at a higher rate, for example every 5 seconds and transmit data at a higher rate, for example every 5 minutes. As evening twilight conditions return, the smart sensor device can wind down and eventually return to sleep mode until the next morning. The frequency of sampling, logging and transmission of data can vary, depending on the data resolution required, and depending on the type of transmission system, as identified in the chart of FIG. 8.

In exemplary embodiments, remote management of the smart sensor devices 11 can be provided such that highly-reliable and accurate service can be delivered. Remote management allows for data quality management, calibration and configuration changes and remote diagnostics, including hardware resets, such that field maintenance is minimized. Utilization of the smart sensor devices 11 in remote management mode allows for hassle-free Data as a Service (DaaS) coupled with the accuracy of on-site calibrated sensors.

Figure 5:
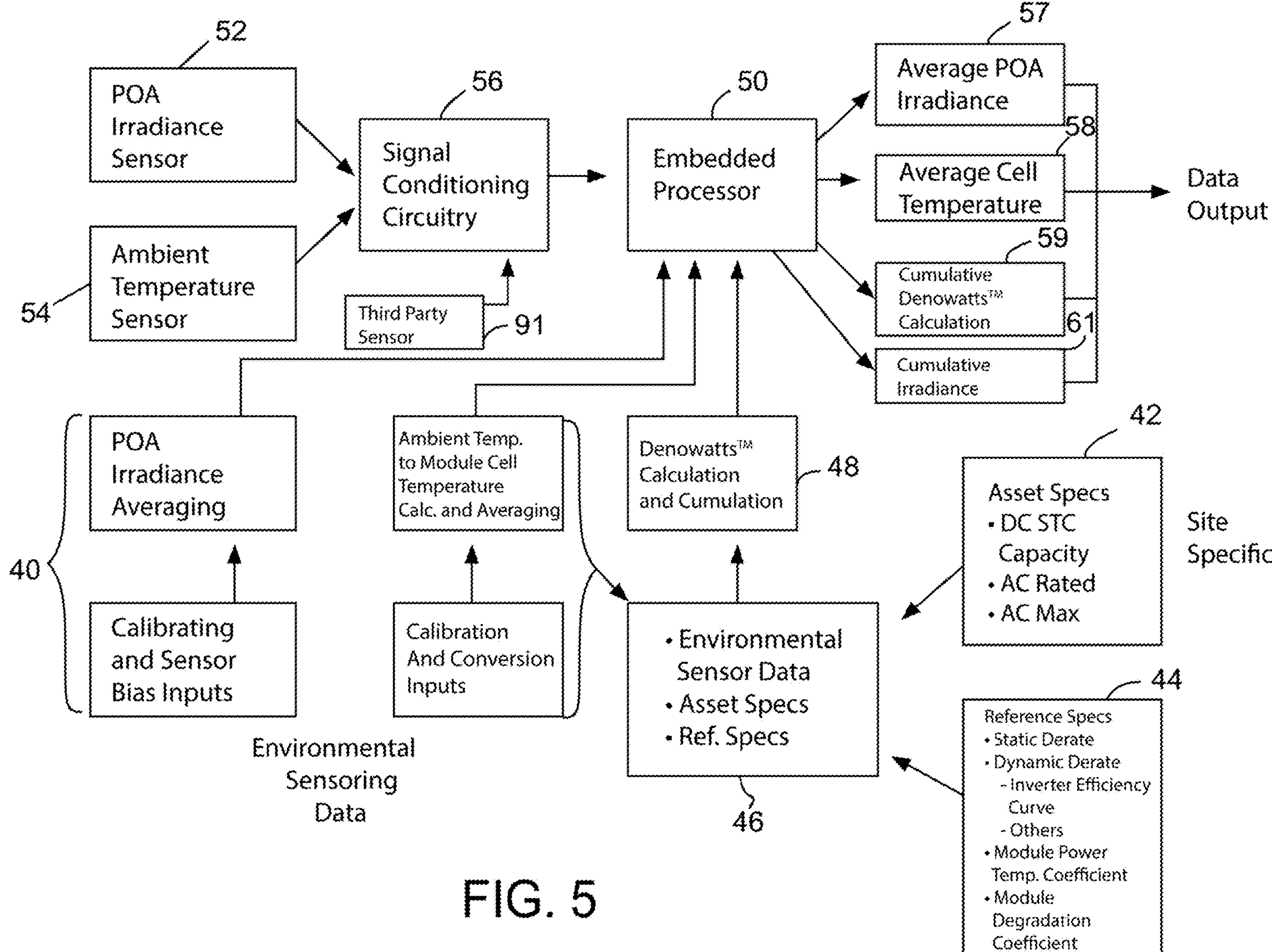
FIG. 5 depicts data logic and data flow in accordance with an exemplary embodiment of the present inventive concepts.

Referring now to FIG. 5, an exemplary embodiment depicts the data logic and data flow described herein. Environmental sensoring data 40, asset specification data 42 and reference specification data 44 are determined and recorded 46. In some embodiments, asset specification data 42 can include one or more of the following: DC STC capacity, AC Rated and AC Max information. In some embodiments, reference specification data 44 can include one or more of the following: static derate, dynamic derate (included inverter efficiency curve and others), module power/temperature coefficients and module degradation coefficients. Denowatts™ calculations and cumulations 48 are computed by the embedded processor 50. Signals from POA irradiance sensors 52 and temperature sensor 54 are provided to signal conditioning circuitry 56 and from there to embedded processor 50. Embedded processor 50 provides data output in the form of average POA irradiance 57, average cell temperature 58, cumulative Denowatts™ metrics 59, and cumulative Irradiance values are determined and recorded.

Figure 6:
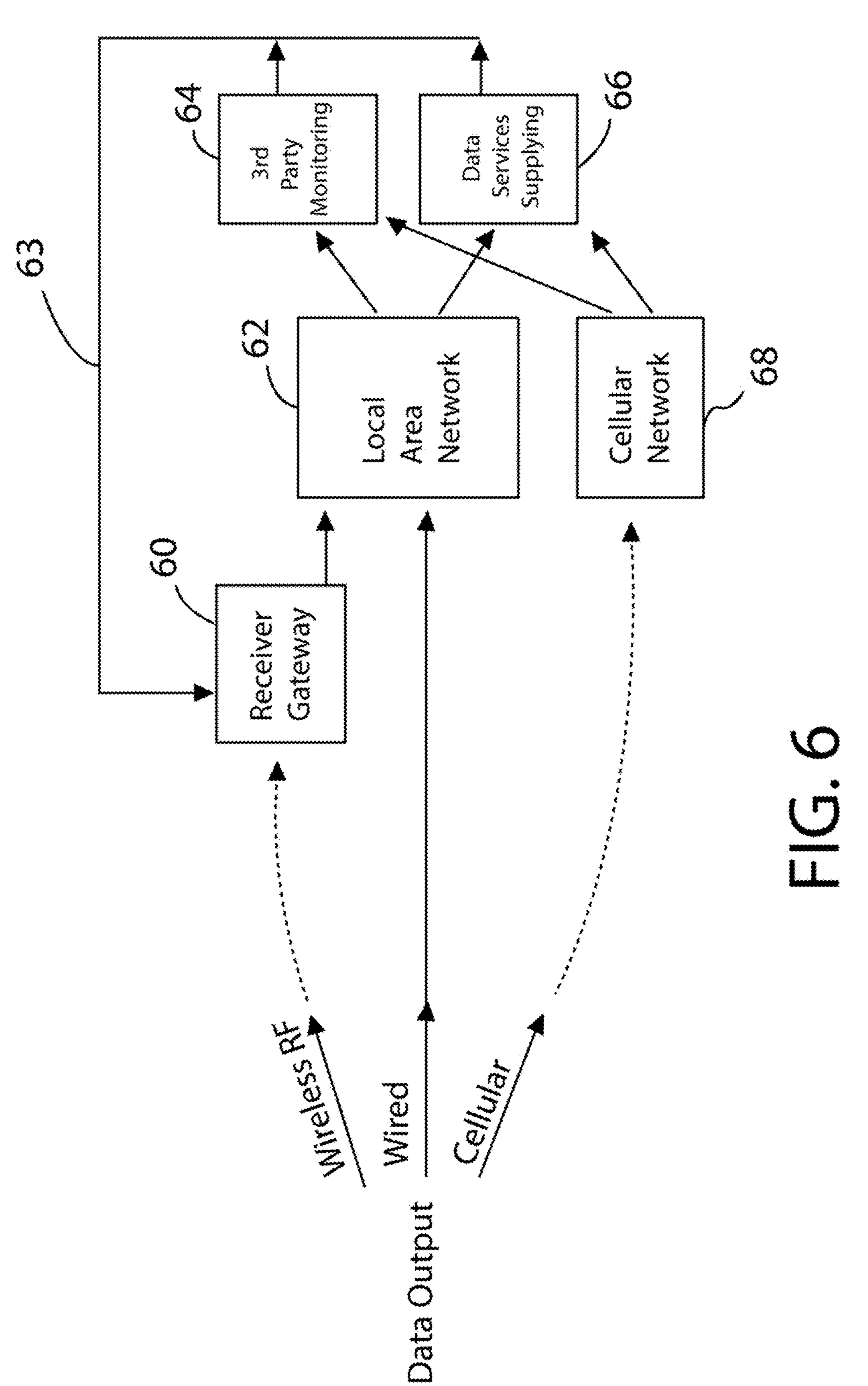
FIG. 6 depicts various communication modes in accordance with exemplary embodiments of the present inventive concepts.

Referring to FIG. 6, there is depicted the various communication modes described above. In various embodiments, data output as depicted in FIG. 5, can be transmitted by wireless RF, hard wired, and cellular, or by using other suitable communication mechanisms. In the embodiment depicted in FIG. 6, the wireless RF is received by receiver/gateway 60 and communicated to local area network 62, which in turn can provide the received information to third party monitoring entity 64 and data services supplying entity 66. Local area network 62 can also receive the data output via hard wiring. Cellular network 68 can also receive the data output and similarly provide the received information to third party monitoring entity 64 and supplier 66.

As depicted in FIG. 6, third party monitoring entity 64 and data services supplying entity 66 can provide via similar transmission mediums 63 to receiver/gateway 60 configuration adjustment data such that one or more of the following can be adjusted at the smart sensor device: component calibration, simulation parameters, instruction code, and sensor drift of an irradiance sensor of the smart sensor device. Instruction code of the processing system of the smart sensor device, which is discussed in more detail herein, can then receive from receiver/gateway 60 the configuration adjustment data to update the smart sensor device. An adjustment of sensor drift of the irradiance sensor can include updating irradiance sensor voltage gain and offset.

Figure 7A:
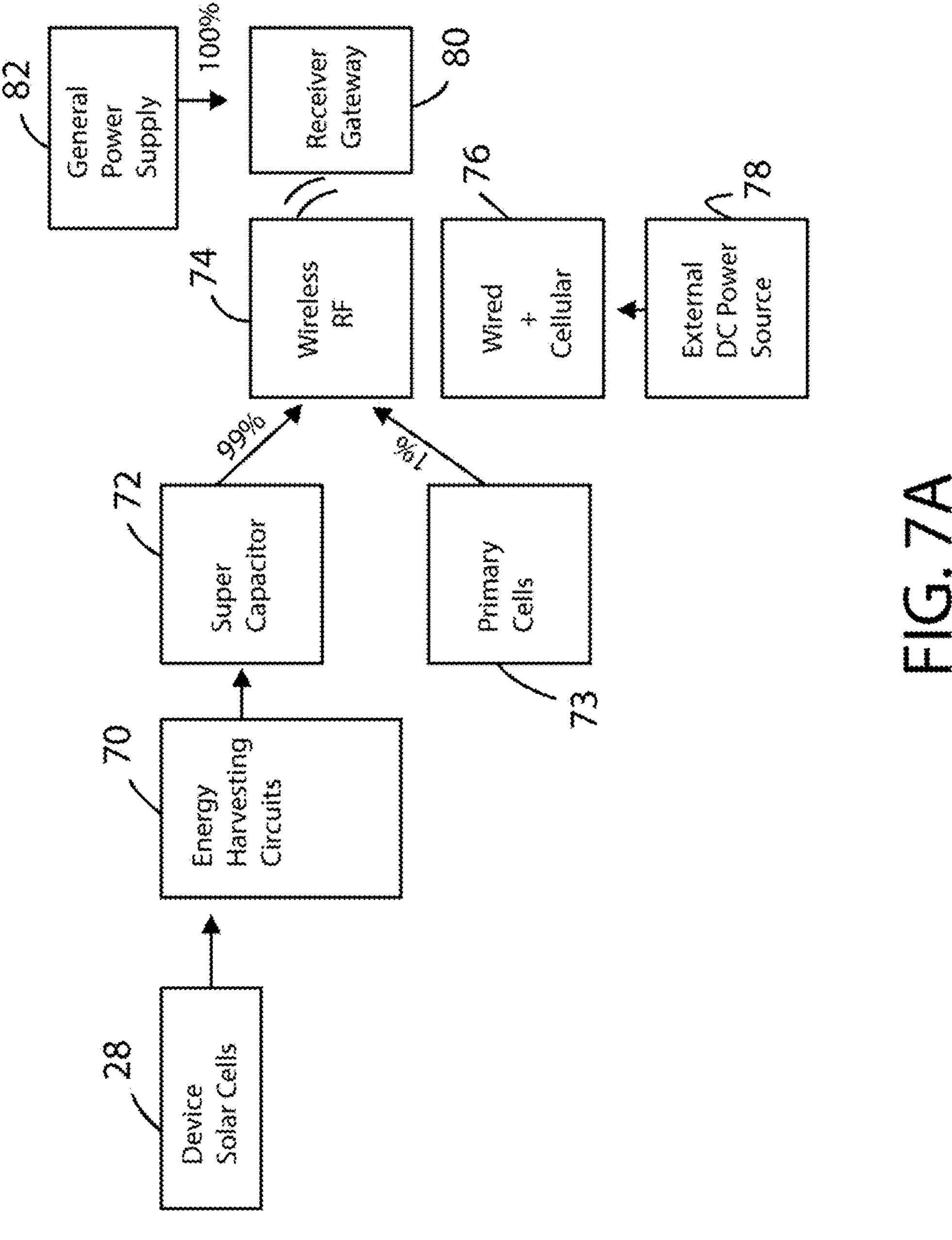
FIGS. 7A and 7B depict various power supplying approaches in accordance with exemplary embodiments of the present inventive concepts.

Referring to FIG. 7A, there is depicted the various power supplying approaches as described above. Device solar array 28, considered primary cells, provide power to energy harvesting circuits 70, which in turn provide power harvested to a harvested power storage device, for example super capacitor 72. In some embodiments, 99% of the power consumed by the wireless RF transceiver 74 is provided by harvested power storage device 72 as discussed in conjunction with FIG. 6. Processor/transceiver/primary cells 73 can include a battery pack that can provide the remaining 1% of the power for the operation of the wireless RF transceiver 74. In some embodiments the battery pack can include lithium battery cells. When the data output transmission depicted in FIG. 6 is wired or cellular 76, 100% of the power can be supplied from an external DC power source 78. Receiver/gateway 80 that receives the data output is typically 100% supplied from general power supply 82.

In exemplary embodiments the smart sensor device 11 can be deemed self-powered. As noted in FIG. 7A, in some embodiments, the smart sensor device 11 can include energy harvesting circuits 70 and storage circuitry which includes a harvested power storage device, such as super capacitor 72. Appropriate programming and power allocation can enable operation of the smart sensor device 11 without the need of an external power source or battery source. In such an embodiment, the smart sensor device 11 can operate under its own locally generated power in order to process the Denowatts™ calculation, obtain its result and provide wireless communications with the receiver/gateway. Such self-powered operation eliminates the need to connect the smart sensor device to a locally wired power supply or battery supply, reduces cost, and ensures that energy generation potential can be continually measured and recorded, even in the absence of power by the solar array. In some embodiments the solar sensor device may record the amount of power "lost" due to the solar array being down. This can be important for energy accounting purposes.

Figure 7B:
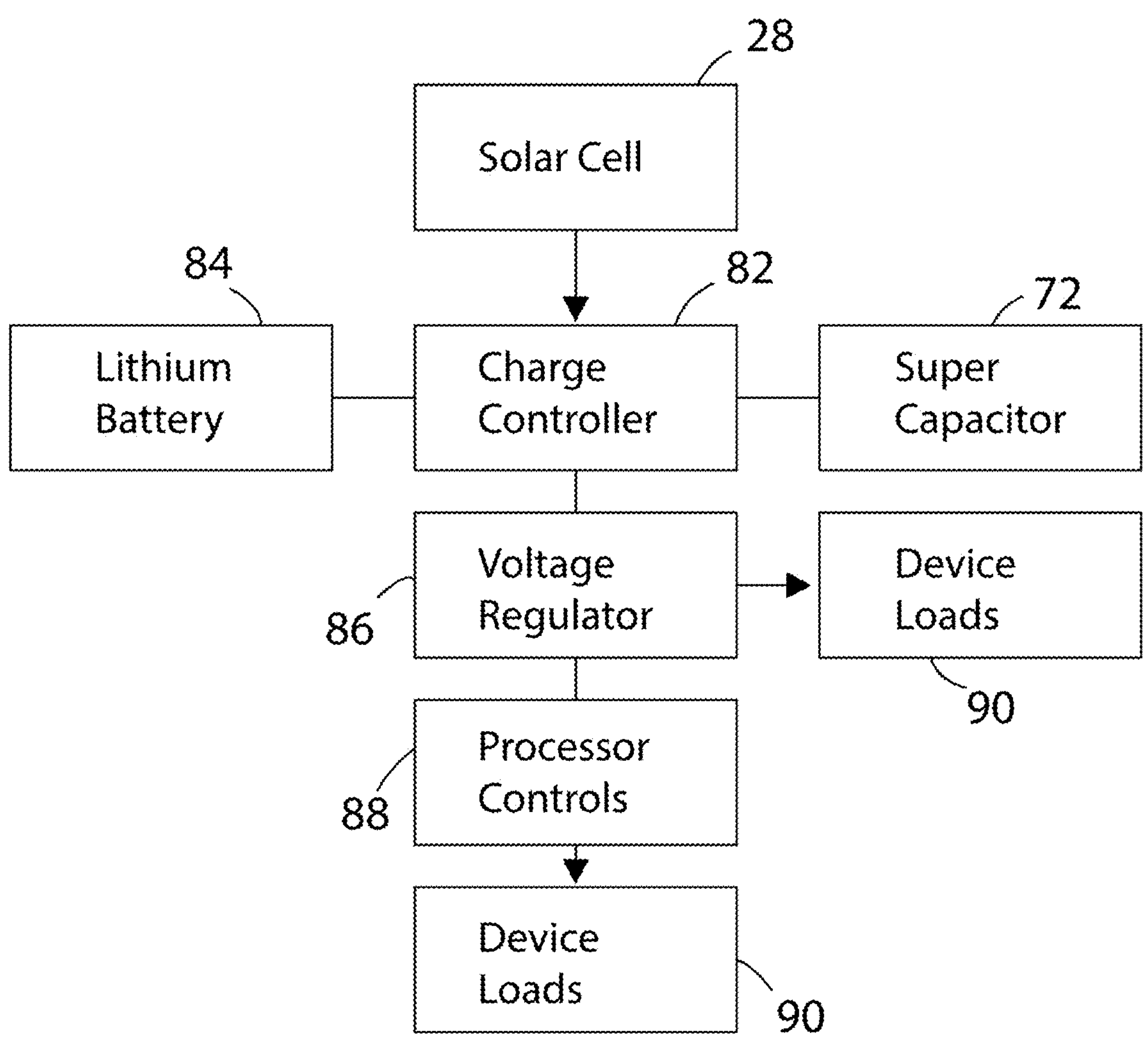

Referring to FIG. 7B, an exemplary embodiment of a power arrangement is depicted. In this example embodiment, device solar array 28 harvests energy directly from sunlight and converts the energy to voltage potential. Charge controller 82 coordinates power to voltage regulator 86 and manages both the transfer and secondary power source switching, as well as the maximum power point tracking for solar cell 28 and super capacitor 72. Lithium battery 84 is a stable power source configured to provide backup power during periods without sunlight for energy harvesting. Super capacitor 72 provides storage for energy harvested from solar cell 28, serving as short-term power storage for the energy harvesting circuit. Voltage regulator 86 regulates the voltages required for the device circuits to operate. Processor 88 controls load switching and is programmed to minimize device power requirements by switching circuits OFF during idle periods, loads 90 being the processing, sensor conditioning and communication circuits.

Referring to FIG. 8, there is depicted typical sampling, logs and reports for each of the daylight, twilight and dark (night-time) modes for each of wireless RF, wired and cellular/Wi-Fi transmissions, as discussed above.

Exemplary embodiments of the present inventive concepts are described herein with reference to flowchart illustrations and/or block diagrams of methods, apparatus (systems) and computer program products which may be configured to provide executable instruction code that implements the processes/flowcharts/equations described herein. It will be understood that each block of the flowchart illustrations and/or block diagrams, and combinations of blocks in the flowchart illustrations and/or block diagrams, can be implemented by computer program instruction code known to those skilled in the art.

The computer program instruction code may be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

Figure 9:
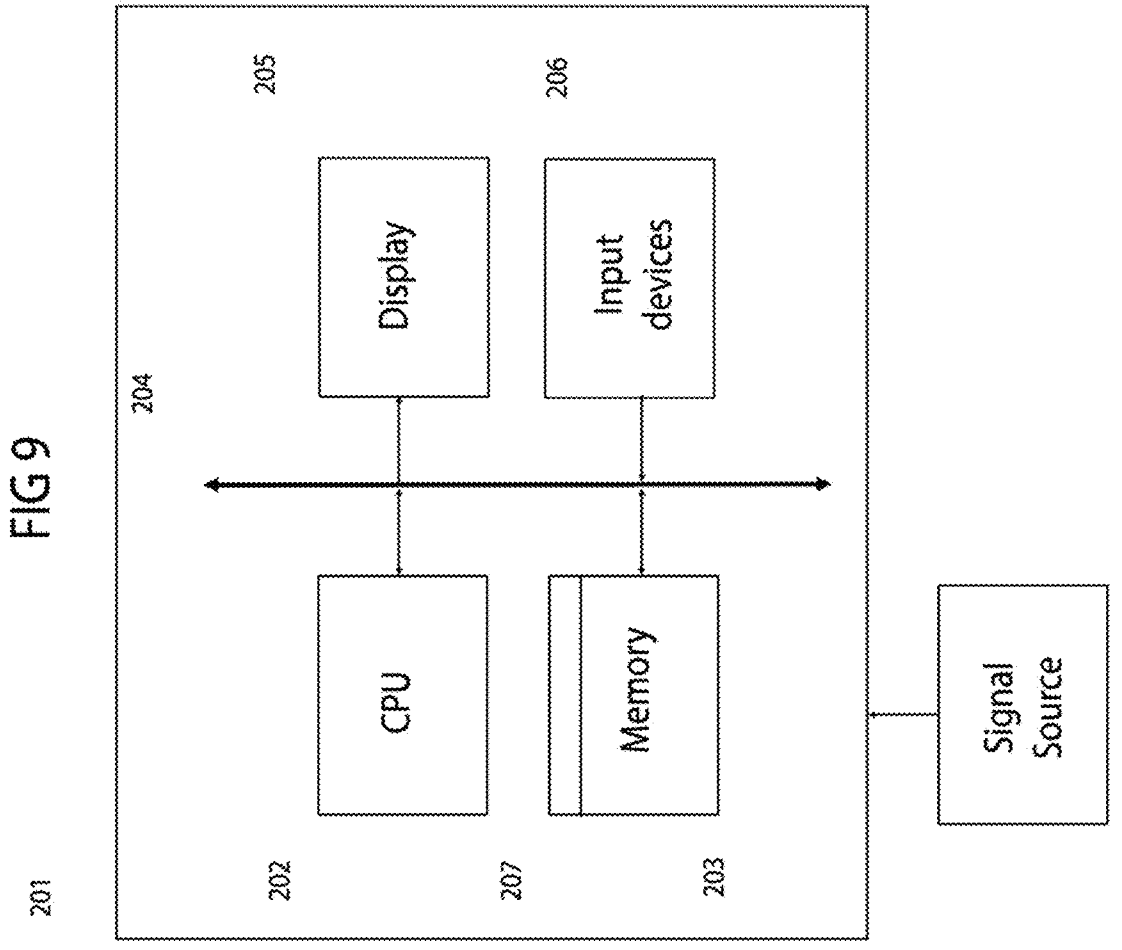
FIG. 9 depicts a representative processing system in accordance with an exemplary embodiment of the present inventive concepts.

For example, FIG. 9 provides a simplified block diagram depicting an exemplary processing system 201 formed in accordance with an exemplary embodiment of the present disclosure. System 201 may receive data from signal source 208, both from within the solar sensor device and remotely from third party monitoring entities and data services supplying entities (as seen in FIG. 6), and may include a processor 202, memory 203 coupled to the processor (e.g., via a bus 204 or alternative connection means), which may include instruction code 207 as disclosed herein, as well as input/output (I/O) circuitry 206 operative to interface with the processor 202. The processor 202 may be configured to perform at least a portion of the methodologies of the present disclosure, illustrative embodiments of which are shown in the above figures and described herein.

It is to be appreciated that the term "processor" as used herein is intended to include any processing device, such as, for example, one that includes a central processing unit (CPU) and/or other processing circuitry (e.g., digital signal processor (DSP), microprocessor, programmable gate array, arrangement of discrete hardware or logic gates, etc.). Additionally, it is to be understood that the term "processor" may refer to more than one processing device, and that various elements associated with a processing device may be shared by other processing devices. The term "memory" as used herein is intended to include memory and other computer-readable media associated with a processor or CPU, such as, for example, random access memory (RAM), read only memory (ROM), fixed storage media (e.g., a hard drive), removable storage media (e.g., a diskette), flash memory, etc. Furthermore, the term "I/O circuitry" as used herein is intended to include, for example, one or more input devices for entering data to the processor, and/or one or more output devices for presenting the results associated with the processor.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of instruction code, which comprises one or more executable instructions for implementing the specified logical function(s) described herein. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the inventive concepts have been particularly shown and described with references to exemplary embodiments thereof, it will be understood by those skilled in the art that various changes in form and details may be made herein without departing from the spirit and scope of the present inventive concepts as defined.

What is claimed is:

1. A device comprising:

a platform constructed and arranged to be mounted to one or more solar array modules:

one or more solar irradiance sensors on the platform configured to receive incident solar energy, the one or more solar irradiance sensors oriented on the platform so that the received incident solar energy is comparable to that received by the solar array modules, the one or more solar irradiance sensors providing solar irradiance signals in response to the incident solar energy;

a processor on the platform, the processor configured to receive the solar irradiance signals and, in response, generating a performance reference metric based on the solar irradiance signals, the performance reference metric related to an expected performance of the one or more solar array modules to which the platform is mounted; and a transmitter on the platform, the transmitter configured to periodically transmit the performance reference metric to a receiver, wherein the processor further generates the performance reference metric based on a cumulative irradiance value, the cumulative irradiance value being based on multiple ones of the solar irradiance signals accumulated over a time period.

2. The device of claim 1, further comprising a temperature sensor that provides a device temperature signal and wherein the processor further generates the performance reference metric based on the device temperature signal.

3. The device of claim 2, wherein the processor further generates the performance reference metric based on a cell temperature signal that is calculated in response to the device temperature signal and the solar irradiance signals.

4. The device of claim 2, wherein the temperature sensor generates the device temperature signal periodically.

5. The device of claim 1, wherein the processor further generates the performance reference metric based on a dynamic derate value that is calculated based on an efficiency function of an inverter of the solar array modules in response to the solar irradiance signals.

6. The device of claim 5, wherein the efficiency function is non-linear.

7. The device of claim 1, wherein the transmitter is further configured to transmit the performance reference metric periodically in response to a mode of operation, the mode of operation being determined in response to a time of day.

8. The device of claim 7, wherein the mode of operation results in more frequent transmission during a time of day where more intense sun exposure is expected and results in less frequent transmission during a time of day when less intense or no sun exposure is expected.

9. The device of claim 1, wherein the processor is further configured to generate the performance reference metric periodically in response to a mode of operation, the mode of operation being determined in response to a time of day.

10. The device of claim 9, wherein the mode of operation results in more frequent generation of the performance reference metric during a time of day where more intense sun exposure is expected and results in less frequent generation of the performance reference metric during a time of day when less intense or no sun exposure is expected.

11. The device of claim 1, wherein a portion of the platform is constructed and arranged to be positioned on a top surface of the one or more solar array modules, the portion having a maximum width in a first horizontal direction and having a maximum height above the top surface in a vertical direction, wherein the maximum width is greater than or equal to two times the maximum height.

12. The device of claim 1, wherein a portion of the platform is constructed and arranged to be positioned on a top surface of the one or more solar array modules, the portion having a maximum width in a first horizontal direction and having a maximum height above the top surface in a vertical direction, wherein the maximum width is greater than or equal to three times the maximum height.

13. The device of claim 1, wherein the platform comprises a circuit board and wherein solar irradiance sensors comprise a pyranometer, the pyranometer comprising:

a diffuser for receiving incident solar energy, the diffuser comprising an inner chamber; and a photodiode positioned in the inner chamber for converting the solar energy received by the diffuser into a current signal;

wherein the inner chamber is of a sufficient height to accommodate a maximum height of a photodiode selected among a plurality of photodiode types; and wherein the inner chamber is of a sufficient width to accommodate a maximum width of a photodiode selected among a plurality of photodiode types.

14. The device of claim 13, wherein the circuit board includes a photodiode pad including a plurality of conductive pads for mounting any among the plurality of photodiode types.

15. The device of claim 1, further comprising a power source on the platform for powering the processor and the transmitter, the power source comprising a solar collector on the platform and a power storage element on the platform for storing energy collected by the solar collector.

16. The device of claim 15, wherein the power storage element comprises a super capacitor.

17. The device of claim 15, wherein the solar collector and storage element comprise an exclusive power source for the device.

18. The device of claim 15, further comprising a supplemental battery.

19. The device of claim 1, wherein the processor further generates the performance reference metric based on a static value that is calculated based on an estimate of expected power loss in the solar array modules.

* * * * *